United States Patent [19]
Sakai et al.

[11] Patent Number: 5,679,456
[45] Date of Patent: Oct. 21, 1997

[54] FIBER REINFORCED THERMOPLASTIC RESIN STRUCTURE, PROCESS FOR PRODUCTION OF SAME, AND EXTRUDER FOR PRODUCTION OF SAME

[75] Inventors: Hidetoshi Sakai, Nagoya; Motoki Hiratsuka, Aichi; Akihiko Watanabe; Motonobu Yamada, both of Nagoya, all of Japan

[73] Assignee: Toray Industries, Inc., Japan

[21] Appl. No.: 277,477

[22] Filed: Jul. 19, 1994

[30] Foreign Application Priority Data

Jul. 21, 1993 [JP] Japan .................................. 5-180524
Dec. 1, 1993 [JP] Japan .................................. 5-301445
Jun. 14, 1994 [JP] Japan .................................. 6-130736

[51] Int. Cl.$^6$ .................................................. D02G 3/00
[52] U.S. Cl. .......................... 428/340; 428/189; 428/347; 428/340; 428/349; 428/350
[58] Field of Search ........................... 428/220, 288, 428/296, 297, 303, 357, 359, 364, 401, 189, 394, 340, 347, 348, 349, 350

[56] References Cited

U.S. PATENT DOCUMENTS 4,980,232 12/1990 Prevorsek et al. ........................ 428/401

FOREIGN PATENT DOCUMENTS

| 44-16793 | 7/1969 | Japan . |
| 62-57491 | 9/1984 | Japan . |
| 60-221460 | 11/1985 | Japan . |
| 4-125110 | 4/1992 | Japan . |

OTHER PUBLICATIONS

"Advances in Compounding Techniques for Glass Fiber Reinforced Plastics," by Stam Jakopin, 27th Annual Technical Conference, 1972, Reinforced Plastics/Composites Institute, The Society of the Plastics Industry, Inc., Section 11–C, pp. 1–8.

*Primary Examiner*—Richard Weisberger
*Attorney, Agent, or Firm*—Austin R. Miller

[57] ABSTRACT

A fiber reinforced thermoplastic resin structure comprising a thermoplastic resin and reinforcing fibers, having a ratio (Lw/Ln) of the number average fiber length (Ln) to the weight average fiber length (Lw) of the uniformly dispersed reinforcing fibers of 1.1 to 5, and having a weight average fiber length of 1.0 mm to 200 mm as well as a process and extruder for the production thereof.

14 Claims, 16 Drawing Sheets

Fig.15a  Fig.15b  Fig.15c
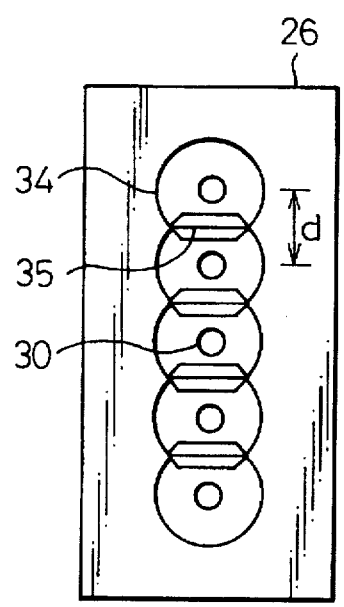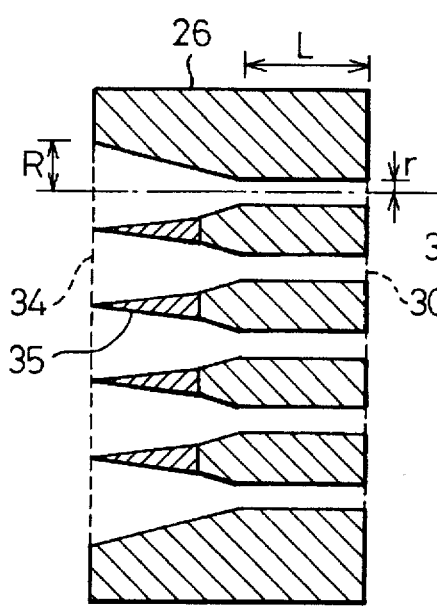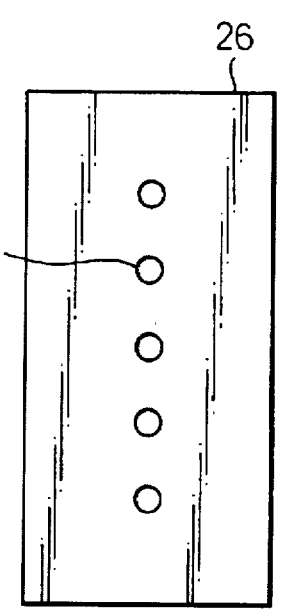
Fig.15d
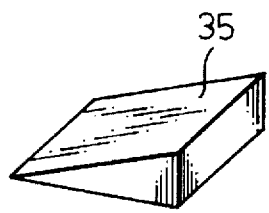

A-B CROSS-SECTION

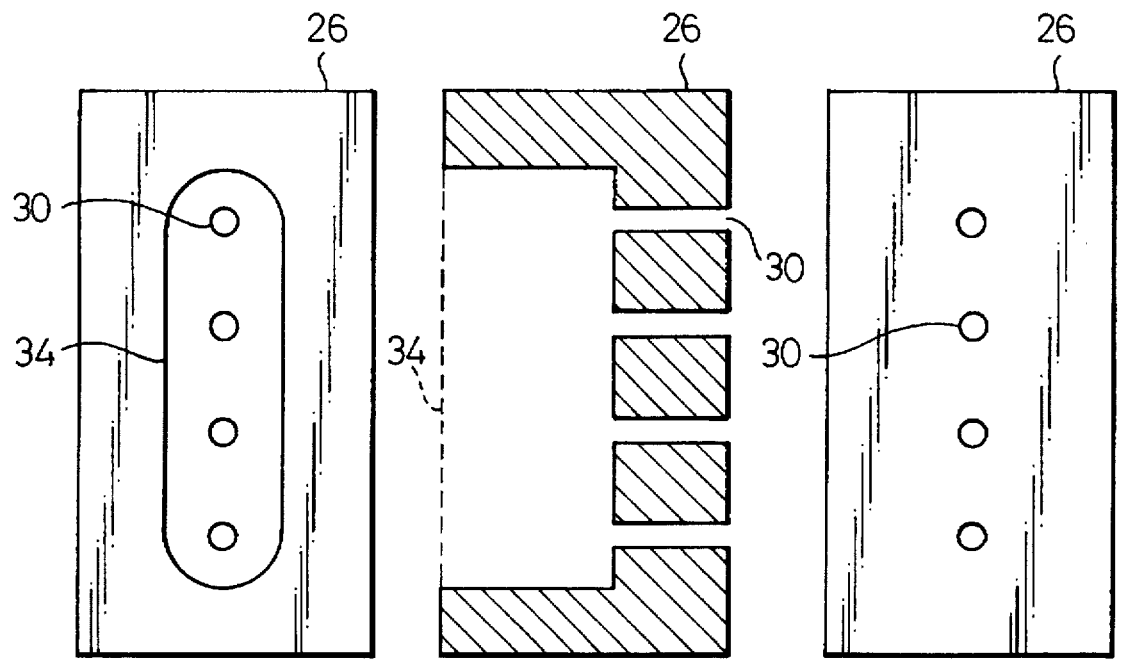

FIBER REINFORCED THERMOPLASTIC RESIN STRUCTURE, PROCESS FOR PRODUCTION OF SAME, AND EXTRUDER FOR PRODUCTION OF SAME

BACKGROUND OF THE INVENTION

1. Field of the Invention

The present invention relates to a fiber reinforced thermoplastic resin structure controlled in the degree of combing of the reinforcing fibers and fiber length and superior in shapeability (or moldability), mechanical properties, and surface smoothness, a process for production of the same having a high productivity, and an apparatus for production of the same. More particularly, it relates to fiber reinforced thermoplastic resin pellets suitable for making automobile cylinder head covers, bumper beams, seat frames, instrument panels, wheel caps, battery trays, etc., office automation equipment and home appliance chassis, housings, etc., and further tool housings and fiber reinforced thermoplastic sheets suited for extrudates, blow molded products, tubes, pipes, and sheets, and further hot molding use sheets.

2. Description of the Related Art

Fiber reinforced thermoplastic resin structures are used for various types of applications, such as auto parts and parts for office automation equipment, making use of their superior mechanical properties. In particular, studies are underway for increasing the length of the reinforcing fibers so as to improve the mechanical properties etc. For example, in the case of fiber reinforced thermoplastic pellets, as shown in Japanese Examined Patent Publication (Kokoku) No. 41-20738, in a method for extruding a chopped strand using an extruder, the reinforcing fibers end up breaking and therefore good mechanical properties cannot be exhibited. Accordingly, studies have been pursued so as to increase the fiber length of the reinforcing fibers so as to improve the mechanical properties etc. As shown in Japanese Examined Patent Publication (Kokoku) No. 63-37694, a roving of reinforcing fiber connected by the pultrusion method is covered with a plastic and cut into predetermined lengths to form pellets. Further, there are also known pellets with uniformly dispersed reinforcing fibers of a fiber length of 3 to 20 mm obtained by the paper machine process and the dry nonwoven fabric process as shown in Japanese Unexamined Patent Publication (Kokai) No. 3-7307 and pellets obtained by mixing a resin powder and glass fibers in advance in a Henschel mixer etc. and then melting in a ram extruder as shown in Japanese Unexamined Patent Publication (Kokai) No. 63-9511. Further, in the case of thermoformable sheets, there are known sheets obtained by the laminate method of sandwiching in a glass fiber mat between thermoplastic resin sheets such as shown in Japanese Examined Patent Publication (Kokoku) No. 63-15135, sheets obtained by the paper making machine process including discontinuous filaments of 7 to 50 mm length such as shown in Japanese Examined Patent Publication (Kokoku) No. 4-40372, the process for obtaining thermoplastic resin sheets by mixing thermoplastic resin powder and reinforcing fibers under a jet of air, causing the mixture to accumulate on a conveyor belt to transport the same and at the same time heating and pressurizing the same to melt the thermoplastic resin such as shown in Japanese Unexamined Patent Publication (Kokai) No. 59-49929 and Japanese Unexamined Patent Publication (Kokai) No. 62-208914, and a thermoplastic resin sheet obtained by the method of introducing thermoplastic resin and a web-like material of glass fibers of 3 to 100 mm length into an extruder and feeding the same into a melt extrusion die to form a web sheet such as shown in Japanese Unexamined Patent Publication (Kokai) No. 2-235613.

Further, as the method for feeding a continuous roving into an extruder, there is known the method of placing the glass fibers into the melt in a screw extruder in the form of a braid and cutting it into suitable lengths such as shown in Japanese Examined Patent Publication (Kokoku) No. 44-16793. Further, as attempts to control the degree of combing and fiber length of reinforcing fibers by an extruder, there are known the process of supplying a glass roving from the second supply port of a twin-screw extruder to separate it into filaments such as in Japanese Unexamined Patent Publication (Kokai) No. 58-56818, a reinforced material such as shown in Japanese Unexamined Patent Publication (Kokai) No. 60-221460, a material dispersed with short fibers cut in the kneading apparatus such as shown in Japanese Unexamined Patent Publication (Kokai) No. 4-125110, and the process of kneading using piston motion such as shown in Japanese Examined Patent Publication (Kokoku) No. 4-80810. Further, as an extruder with a processed screw or cylinder, there are known screws provided with combing and kneading regions having large numbers of projections for grinding down organic fillers such as shown in Japanese Examined Patent Publication (Kokoku) No. 62-57491, screws of barrier type mixing sections roughened to crush the inorganic matter, additives, etc. such as shown in Japanese Examined Patent Publication (Kokoku) No. 63-56845, and kneading elements composed of specially processed cylinders or screws for kneading thermoplastic resins such as shown in Japanese Examined Patent Publication (Kokoku) No. 60-8934.

However, in the above structures, while the reinforcing fibers become longer in length, their degree of combing and kneading action are insufficient, and therefore, not only are the fluidity and mechanical properties insufficient, but also the productivity thereof is low. In particular, pellets obtained by the pultrusion process and pellets obtained by the process of Japanese Examined Patent Publication (Kokoku) No. 44-16793 contain fibers of long fiber length, but the degree of combing of the fibers is also poor, so when press formed, the plastic and fibers end up separating or the fluidity at the time of injection molding is poor. Further, in the case of the paper-machine process, while there is no fiber breakage and uniform shaped articles with fibers dispersed down to the filament level are obtained, the kneading action is small, so the bonding strength at the interface of the plastic and reinforcing fibers is low and the mechanical properties are inferior. Further, the glass mat laminate process gives superior mechanical properties, but the fluidity is poor at the time of press forming and other hot molding and the fiber does not flow to the corner portions etc. Therefore, there has been a demand for a fiber reinforced thermoplastic resin structure controlled in degree of combing and fiber length of the reinforcing fibers, superior in fluidity, mechanical properties, and surface smoothness, and high in productivity.

In general, use of an extruder enables high productivity, but in the processes of Japanese Unexamined Patent Publication (Kokai) No. 58-56818, Japanese Unexamined Patent Publication (Kokai) No. 60-221460, Japanese Unexamined Patent Publication (Kokai) No. 4-125110, and Japanese Examined Patent Publication (Kokoku) No. 4-80810, the degree of combing and fiber length of the reinforcing fibers could not be sufficiently controlled and when the kneading action of the screw was strengthened, the fiber length ended up becoming shorter and the mechanical properties falling. If the kneading was made weaker, the degree of combing became insufficient and the reinforcing fibers nonhomogeneous. Further, Japanese Examined Patent Publication (Kokoku) No. 62-57491, Japanese Examined Patent Publication (Kokoku) No. 63-56845, and Japanese Examined Patent Publication (Kokoku) No. 60-8934 merely ground down the inorganic or organic fillers and kneaded the thermoplastic resins, so could not control the degree of combing and fiber length of the reinforcing fibers.

SUMMARY OF THE INVENTION

Accordingly, the object of the present invention is to provide a fiber reinforced thermoplastic resin structure which is superior in fluidity, mechanical properties, surface smoothness by dispersing the reinforcing fibers uniformly in the thermoplastic resin to achieve a specific distribution of fiber lengths while keeping the weight average fiber length long.

Another, object of the present invention is to provide a fiber reinforced thermoplastic resin structure which is superior in fluidity, mechanical properties, surface smoothness, etc. by providing a fiber reinforced thermoplastic resin structure which is controlled in its degree of combining and has reinforcing fibers uniformly dispersed throughout it and which is given a specific distribution of fiber length by a kneading action while maintaining the weigh average fiber length long.

A further object of the present invention is to provide a fiber reinforced thermoplastic resin structure which is superior in fluidity, mechanical properties, surface smoothness, etc. by providing a fiber reinforced thermoplastic resin structure of sheets or pellets which are combed to a high degree, have a long weight average fiber length, and have a specific distribution of fiber length.

A further object of the present invention is to provide a process for production of a fiber reinforced thermoplastic resin structure superior in fluidity and mechanical properties by controlling the degree of combing and/or fiber length of the reinforcing fibers by melt extrusion of the thermoplastic resin and continuous roving by an extruder having a specific construction.

A still further object of the present invention is to provide an extruder capable of providing a fiber reinforced thermoplastic resin structure superior in fluidity and mechanical properties by controlling the degree of combing, weight average fiber length, or fiber length of supplied continuous fibers.

That is, to achieve the objects of the present invention, there is provided a fiber reinforced plastic structure including reinforcing fibers, which fiber reinforced plastic structure is characterized in that the ratio (Lw/Ln) of the number average fiber length (Ln) to the weight average fiber length (Lw) of the reinforcing. fibers uniformly dispersed in the structure is from 1.1 to 5 and the weight average fiber length is from 1.0 mm to 200 mm.

Further, the present invention provides a process for production of a fiber reinforced thermoplastic resin structure by melt extrusion of the thermoplastic resin and continuous roving by an extruder, which process for production of a fiber reinforced thermoplastic resin structure is characterized in that the degree of combing and/or fiber length of the reinforcing fibers in the plastic matrix are controlled by the combing action of irregularly shaped processed surfaces by passing the melted thermoplastic resin and reinforcing fibers through a control mechanism formed by processing of a screw and/or cylinder to make its surface irregular at least at part of the screw surface and/or cylinder inner wall and provides an extruder for production of a fiber reinforced thermoplastic resin structure provided with a screw and cylinder, which extruder for production of a fiber reinforced thermoplastic resin structure is provided with a control mechanism formed by processing a screw and/or cylinder to have irregularly shaped processed surfaces enabling control of the degree of combing and fiber length by combing the supplied continuous roving.

Further, there is provided one of the above-mentioned extruders characterized by correcting the spiral flow caused by the extruder screw by attaching one or more plates in the cylinder of the extruder between the front end of the screw and the die. When the fiber reinforced thermoplastic resin structure is a pellet, to prevent breakage of the reinforcing fibers at the die portion during stranding during production of the fiber reinforced thermoplastic resin pellets, provision is made of a die assembly which is attached to the front end of the extruder directly or via an adaptor and which is thermoplastic resin plates of a predetermined thickness formed with a plurality of through holes, which die has through holes of a frustoconical shape, which has a value of R/r greater than 1 when the radius of the circle formed by a through hole at the extruder side and the discharge section side are R and r, respectively, which circles formed by the through holes at the extruder side covering at least 90% of the front end of the extruder to which the die is provided or the discharge sectional area of the adaptor.

BRIEF DESCRIPTION OF THE DRAWINGS

FIG. 15a is a view of a die of a preferable embodiment of the invention seen from the extruder side, FIG. 15b is a sectional view of the same seen from the side, FIG. 15c is a view of the same seen from the discharge side, and FIG. 15d is an enlarged perspective view of a wedge shaped partition plate 35.

FIG. 16d is a sectional view along A-B in FIG. 16a.

FIG. 17a is a view of a die used in a Comparative Example seen from the extruder side, FIG. 17b is a sectional view of the same seen from the side, and FIG. 17c is a view of the same seen from the discharge side.

DESCRIPTION OF THE PREFERRED EMBODIMENTS

Figure 1:
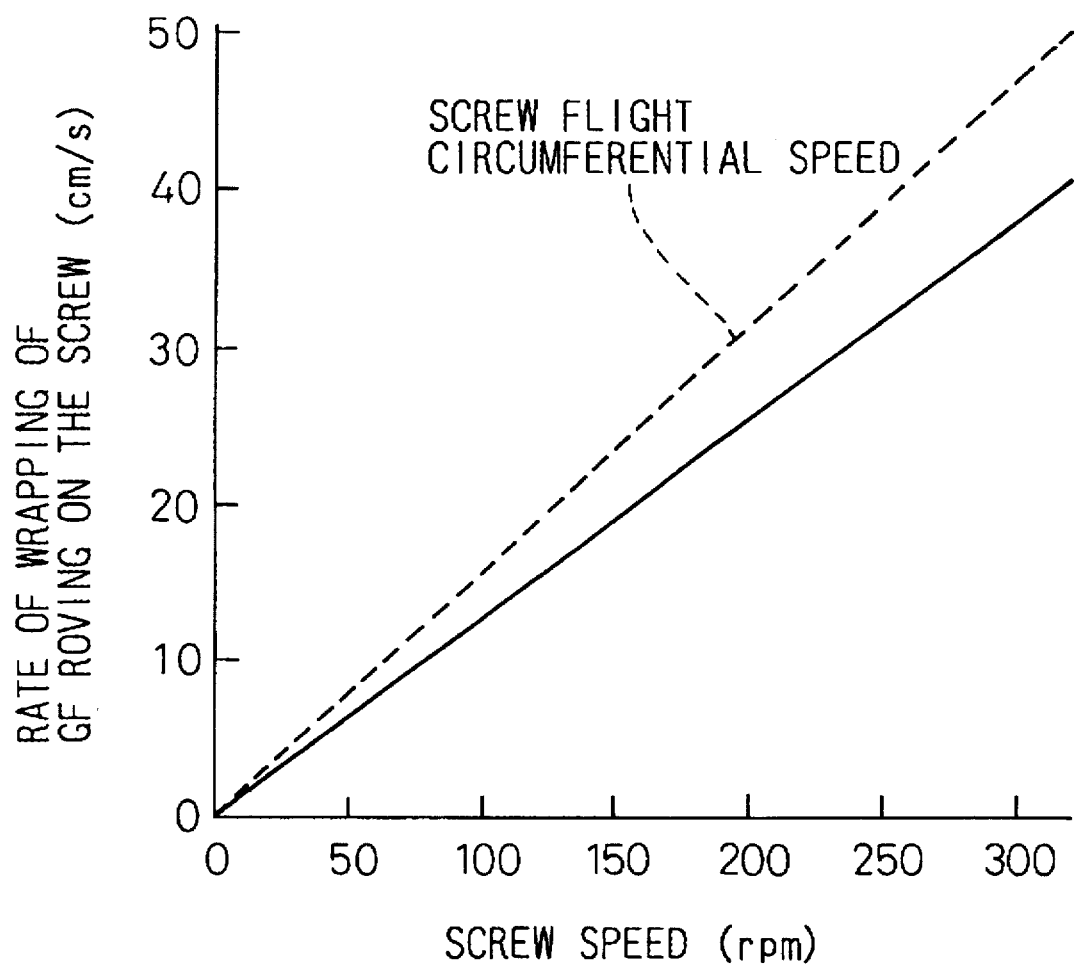
FIG. 1 is a graph of the relationship between the winding speed of the glass roving and the rotational speed of the screw in the case of use of a twin-screw extruder with a screw diameter of 30 mm and polyethylene terephthalate. The broken line shows the circumferential speed of the outermost screw flight, while the solid line shows the winding speed of the roving.

The present invention will now be described in detail below.

The thermoplastic resins usable in the present invention are not particularly limited in so far as they are thermoplastic which can be shaped or molded by an extruder. Mention may be made for example of a polyethylene, polypropylene, polyvinyl chloride, polyvinylidene chloride, polystyrene, styrene-butadiene-acrylonitrile copolymer, nylon 11, nylon 12, nylon 6, nylon 66, and other aliphatic nylons, copolymers of aliphatic nylon further copolymerized with terephthalic acid or other aromatic dicarboxylic acids or aromatic diamines, and other aromatic polyamides, various copolymerized polyamides, polycarbonate, polyacetal, polymethylmethacrylate, polysulfone, polyphenylene oxide, polybutylene terephthalate, polyethylene terephthlate, polycyclohexane diethylene terephthalate, polybutylene naphthalate, and other polyesters and copolymers of the same, copolymerized polyesters of these polyesters used as hard segments and polytetramethylene glycol or other polyesters or polycaprolactone and other polyesters used as soft segments, thermotropic liquid crystal polymers as described in Japanese Examined Patent Publication (Kokoku) No. 3-72099, polyphenylene sulfide, polyether ether ketones, polyether sulfones, polyether imides, polyamide imides, polyimides, polyurethane, polyether amides, and polyester amides. These may be used alone or in any combinations thereof.

The most preferred plastics are polyethylene, polypropylene, polybutylene terephthalate, polyethylene terephthalate, polycyclohexane dimethylene terephthalate, polyethylene terephthalate copolymer liquid crystal polymers, nylon 11, nylon 12, nylon 6, nylon 66, aromatic nylons, copolymerized nylons, polyphenylene sulfide, and ABS resin.

As the continuous roving used in the present invention, use is preferably made of roving comprising a bundle of continuous filaments. The reinforcing fibers are not particularly limited in so far as they normally can be used for reinforced thermoplastic resins. Use may be made of glass fiber, carbon fiber, metal fiber, and organic fiber (nylon, polyester, aromatic polyamides, polyphenylene sulfide, liquid crystal polymers, acrylic, etc.) etc., which may be used alone or in any combinations thereof. Glass fiber or carbon fiber are most preferred. Further, the fiber diameter is not particularly limited in so far as it is one usually used for reinforcing plastics, but use may preferably be made of a fiber of a diameter of 1 to 20 μm. In particular, the effect of improvement of mechanical properties is great with a fine fiber of 1 to 9 μm or so. The number of filaments bundled in the fiber is not particularly limited either, but a bundle of 10 to 20,000 filaments or monofilaments is preferable in terms of handling. Usually, rovings of these reinforcing fibers may be used after surface treatment by silane coupling agent etc. for improvement of the interfacial bonding with the thermoplastic resin. For example, in the case of a polyester resin, surface treatment may be performed by a thermoplastic film forming polymer, coupling agent, fiber lubricant, etc. known in Japanese Examined Patent Publication (Kokoku) No. 4-47697 etc. Such surface treatment may be performed in advance and use made of the treated reinforcing fibers or may be performed just before the reinforcing fibers are fed into the extruder so as to continuously produce the structure of the present invention. The ratio between the thermoplastic resin and fiber is not particularly limited. It is possible to produce the fiber reinforced thermoplastic resin composition and shaped articles of the same using any ratio of composition in accordance with the final object of use, but preferably the content of fibers is 0.5 to 90% by weight, particularly preferably 1 to 60% by weight, in view of the mechanical properties and the surface smoothness.

The "structure" of the present invention means blow molded articles, rod (including tubes, pipes, or other hollow articles) or sheet shaped structures, hot molding use sheets or other fiber reinforced thermoplastic resin structures, fiber reinforced thermoplastic resin pellets capable of using for injection molding, extrusion, and other types of molding of automobile cylinder head covers etc., and injection molded articles made by application of the process of production of the present invention.

The ratio (Lw/Ln) of the number average fiber length (Ln) to the weight average fiber length (Lw) of the reinforcing fibers dispersed uniformly through the structure is from 1.1 to 5, more preferably from 1.1 to 3. When this ratio is less than 1.1, the kneading action is small and the bonding at the interface of the thermoplastic resin and fibers is insufficient, so good mechanical properties and fluidity cannot be obtained. The ratio Lw/Ln has more preferable ranges depending on the type of the structure. When the structure is a sheet, the ratio is 1.3 to 5.0, preferably 1.5 to 4.0, more preferably 1.8 to 3.5. When the structure is a pellet, the ratio is 1.2 to 3.5, preferably 1.3 to 2.5, more preferably 1.3 to 2.1.

The weight average fiber length of the fibers in the structure is from 1.0 mm to 200 mm, preferably 1.0 mm to 15 mm, more preferably 4.5 mm to 12 mm. When the weight average fiber length is less than 1.0 mm, the effect of improvement of the mechanical properties is not obtained. There are more preferable ranges depending on the type of the structure for the weight average fiber length as well. When the structure is a sheet, the weight average fiber length is from 3 mm to 200 mm, preferably 4 mm to 50 mm. When the structure is a pellet, the weight average fiber length is 1.0 mm to 15 mm, more preferably 2.0 mm to 5.0 mm.

Further, the "uniform dispersion" of the present invention means the state where the reinforcing fibers and thermoplastic resin do not separate when the structure is melted and compressed. It includes a state where the fibers are dispersed to the filament level to a state where they are dispersed to the level of bundles of several tens of fibers, preferably about five fibers. Further, the "degree of combing" of the present invention can be evaluated by observing a section of the structure by a microscope and determining the ratio of the number of reinforcing fibers in bundles of 10 or more in all of 1000 or more observable reinforcing fibers (total number of reinforcing fibers in bundles of 10 or more/total number of reinforcing fibers×100) (%). This value is preferably not more than 60%, preferably 35% or less, and further preferably 30% or less. When the structure is a pellet, the section of the pellets is observed by a microscope and determination is made of the ratio of the number of reinforcing fibers in bundles of 10 or more in all 1000 or more observable reinforcing fibers (total number of reinforcing fibers in bundles of 10 or more/total number of reinforcing fibers× 100) (%). This value is preferably not more than 60% and preferably is 35% or less.

The weight average fiber length and the number average fiber length in the present invention are found by burning off just the thermoplastic resin of a part of a shaped article in a 500° C. electric furnace, photographing the result by a microscope, measuring the lengths of over 1000 fibers from the photograph, and determining the values from the distribution of the fiber lengths.

As the fiber reinforced thermoplastic resin sheet of the present invention, mention may be made of fiber reinforced plastic sheets etc. used in various applications and obtained by stamping, compression molding, vacuum molding, and other molding methods. The reinforcing fibers are oriented substantially randomly in the plane of the sheet, but depending on the conditions, the ratio of those oriented in the direction of fluid motion may be higher. As a rod-shaped structure, mention may be made of round rods of a diameter of about 1 to 8 mm, rods with various other sectional shapes, such as rectangular shapes, hollow rod-shaped articles, etc.

The fiber reinforced thermoplastic resin pellets of the present invention are structures obtained by pelletizing the above-mentioned sheets, rods, or other structures by pelletizers or sheet cutters. When the above-mentioned sheets are pelletized, they are cut longitudinally and laterally, but rod-shaped structures may be cut in just a single direction and there is less fiber breakage, so it is preferable to pelletize rod shaped structures. The pellet length of the pellets is preferably from 2 mm to 50 mm. Further, to increase the fiber length in the pellets, the pellet length is preferably at least ½ of the weight average fiber length of the fiber reinforced plastic structure before cutting, particularly preferably not more than 15 mm. Further, a feature of the pellets of the present invention is the fact that the weight average fiber length in the pellets is shorter than the fiber length of the rod-shaped articles etc. and is not more than 0.9 times, sometimes not more than 0.7 times of the usual pellet length.

Further, the pellets of the present invention can be used for compression molding, injection molding, extrusion, and other known molding methods. Except for compression molding, with the screw molding machines usually used for injection molding and extrusion, the fiber length and the distribution of the reinforcing fibers feeds due to the molding, so in the pellets of the present invention, the fiber length and distribution in the pellets is defined, not the fiber length and distribution of the shaped articles after the injection molding or extrusion.

The process for production of the structure of the present invention is not particularly limited in so far as the requirements defined by the present invention are satisfied, but a preferable process is to produce the fiber reinforced plastic structure by melt extruding a plastic and continuous roving in the cylinder of an extruder. More specifically, in the process, the reinforcing fibers are combed and the fiber length controlled in the thermoplastic resin matrix by the combing action of irregularly shaped surfaces by passing the molten thermoplastic resin and continuous roving through a control mechanism formed with a screw and/or cylinder which is processed to make its surface irregular at least at part of the screw surface and/or cylinder inner wall.

The "extruder with a screw and/or cylinder processed for combing the continuous roving and controlling the fiber length" means a single-screw or multi-screw extruder provided inside it with a control mechanism for the degree of combing and fiber length of the continuous roving. The continuous roving is wound at a fixed speed in the extruder cylinder by the shearing force between the screw flights and cylinder and advances while being wound on the screw. Usually, the thermoplastic resin flows through the screw grooves, but in the above-mentioned process, the reinforcing fibers advance by riding over the screw flights. Looking at a cross-section of the screw, the flight portion constitutes one part of the overall circumference, so the winding speed and the outermost peripheral speed of the screw have a certain deviation from each other as shown in FIG. 1. FIG. 1 is a graph of the relationship between the winding speed of the glass roving and the rotational speed of the screw in the case of use of a twin-screw extruder with a screw diameter of 30 mm and polyethylene terephthalate. Therefore, by applying various processing to the screw outer circumference and the cylinder inner wall, it is possible to apply a "comb" action between the screw and cylinder to the reinforcing fibers wound on the screw.

As a specific example of a control mechanism, mention may be made of processing on a screw surface or screw flight, preferably a columnar screw surface or neutral element or other elliptic cylindrical screw surface, to roughen the same or a cylinder inner wall to roughen the same. The method of forming the roughness is not particularly limited, but use may be made of cutting, grinding, milling, etc. Further, the type of roughness includes comb types comprised of grooves and protrusions, types with grooves and projections formed at specific angles, and meshes formed with grooves longitudinally and laterally. The front tips of the projections preferably are made sharp in angle, i.e., are given a blade-like shape.

FIGS. 2a to 2d and FIGS. 4a to 4h show specific forms of the roughness. The present invention is not limited to these Examples and includes all processing functioning as a "comb" combing the reinforcing fibers into filaments in accordance with the targeted fiber length.

Figure 2A:
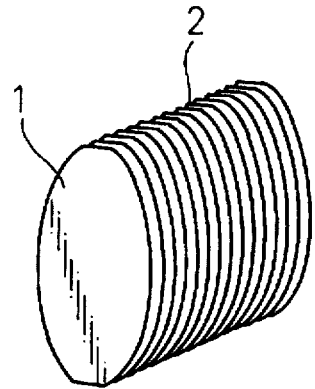
FIG. 2a is a perspective view of a screw processed to have a plurality of blade edges according to a preferable embodiment of the present invention.
Figure 2B:
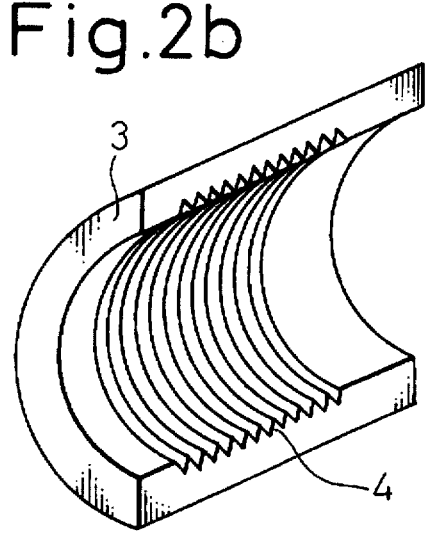
FIG. 2b is a cutaway perspective view of a cylinder processed to have a plurality of blade edges according to a preferable embodiment of the present invention.
Figure 3:
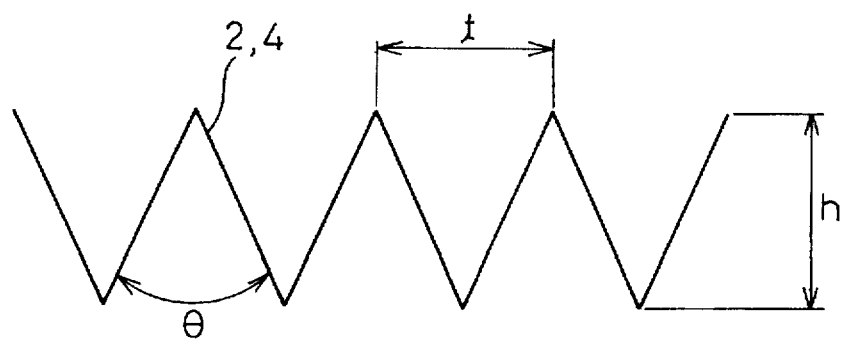
FIG. 3 is a schematic sectional view of the screw or cylinder given the plurality of blade edges shown in FIGS. 2a and 2b showing in an enlarged state the blade edges.

FIG. 2a is an example of an elliptic cylindrical neutral element having on the screw surface of the element blade-shaped processed portions 2 forming roughness with a specific edge angle in the direction perpendicular to the screw shaft. FIG. 2b is an example of a cylinder 3 having a blade-shaped processed portion 4 at the inner wall of the cylinder. The blade-shaped processed portions 2 and 4, as shown in FIG. 3, can be expressed by the specific edge angle (θ), the height (h) of the peaks and valleys of the rough shape, and the distance and pitch (t) between one peak and its adjoining peak.

Figure 2C:
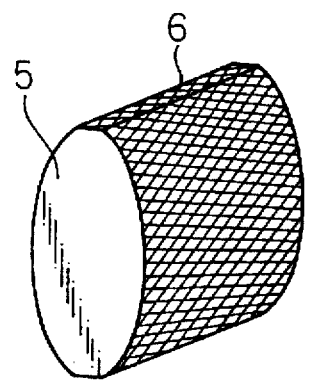
FIG. 2c is a perspective view of a screw processed to have a mesh surface according to a preferable embodiment of the present invention.
Figure 2D:
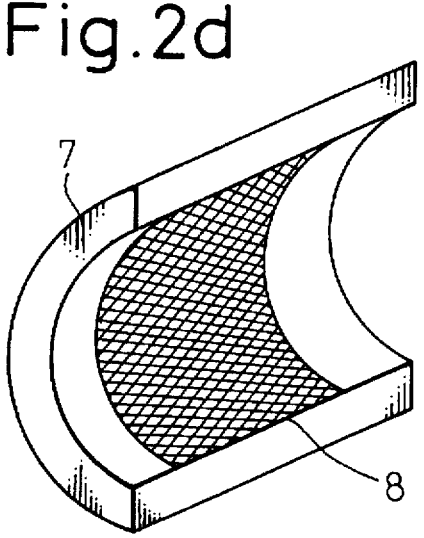
FIG. 2d is a cutaway perspective view of a cylinder processed to have a mesh surface according to a preferable embodiment of the present invention.

FIG. 2c is an example of a screw 5 of a neutral element having a mesh-like processed portion 6 on the screw surface. FIG. 2d is an example of a cylinder 7 having a mesh-like processed portion 8 at the inner wall of the cylinder.

Figure 4A:
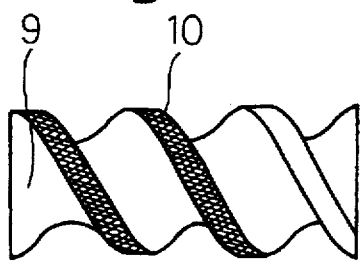
FIGS. 4a, 4c, 4e, and 4g are side views of screws processed according to preferable embodiments of the present invention.
Figure 4B:
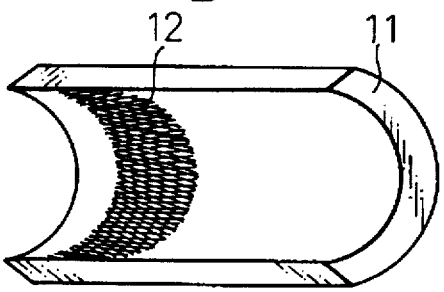
FIGS. 4b, 4d, 4f, and 4h are cutaway perspective views of cylinders processed according to preferable embodiments of the present invention.
Figure 4C:
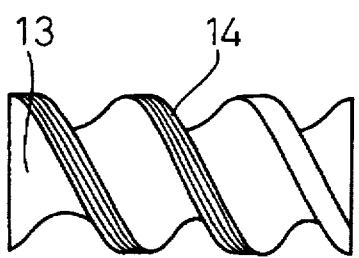
Figure 4D:
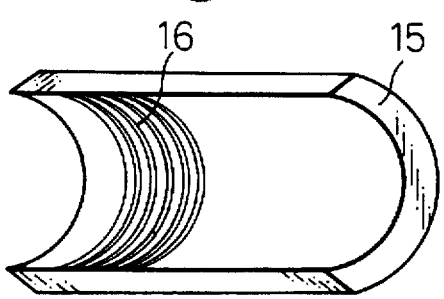
Figure 4E:
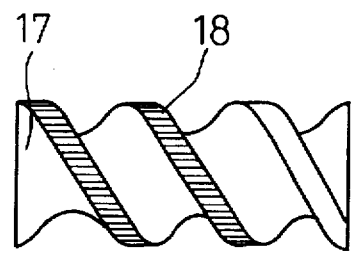
Figure 4F:
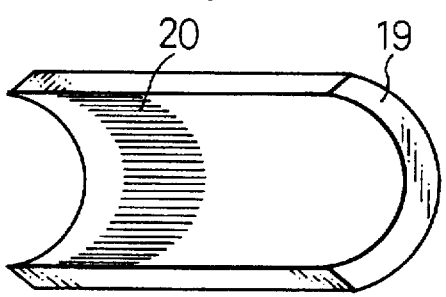
Figure 4G:
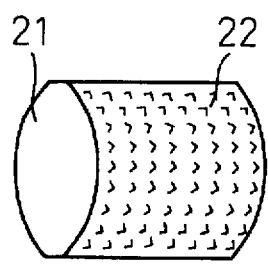
Figure 4H:
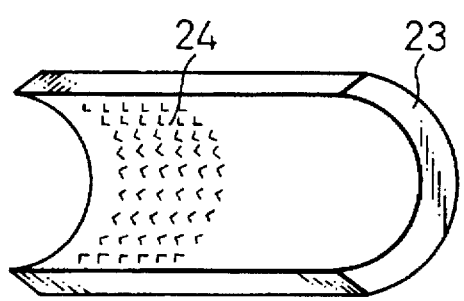
Figure 5A:
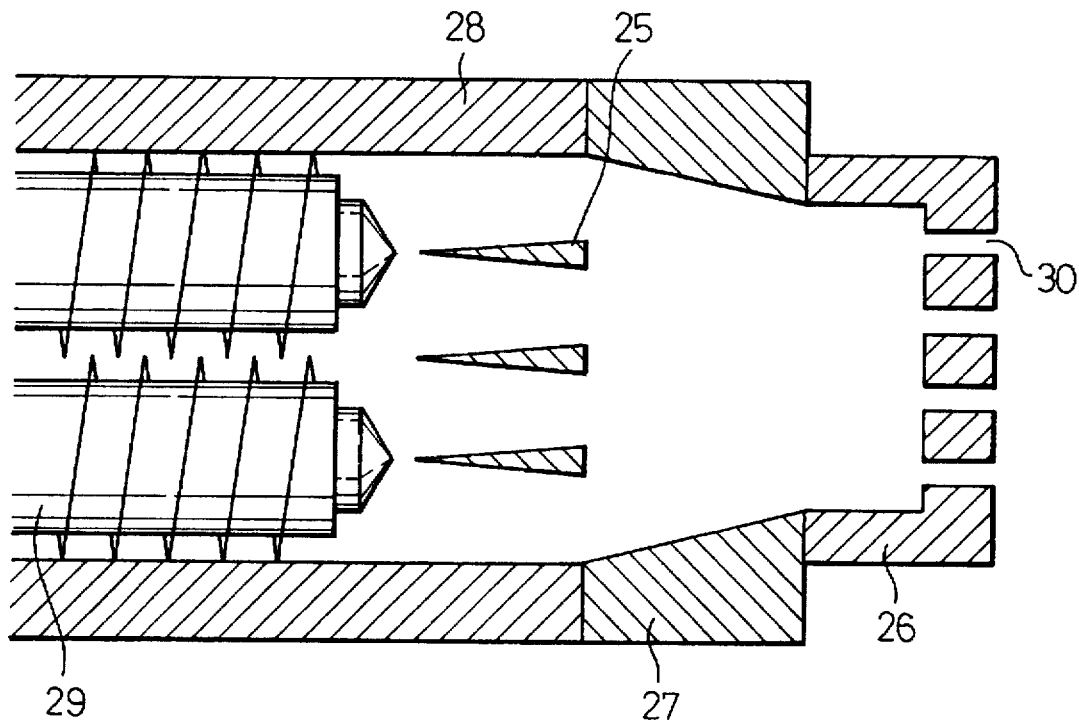
FIG. 5a is a sectional view of the state of attachment of plates of wedge shapes to the inside of the cylinder in front of the screw in a twin-screw extruder as seen from above the extruder.
Figure 5B:
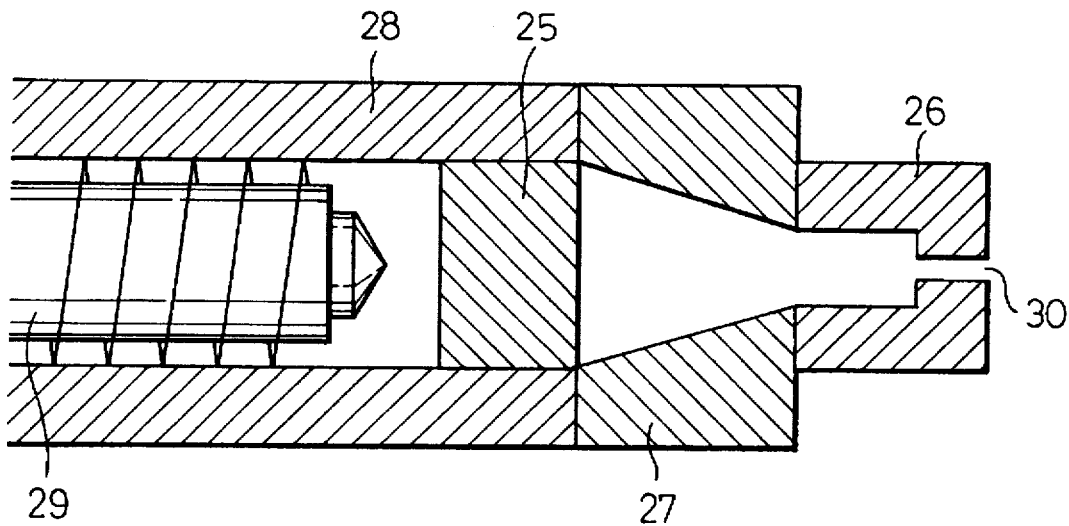
FIG. 5b is a sectional view of FIG. 5a seen from the lateral direction of the extruder.
Figure 6A:
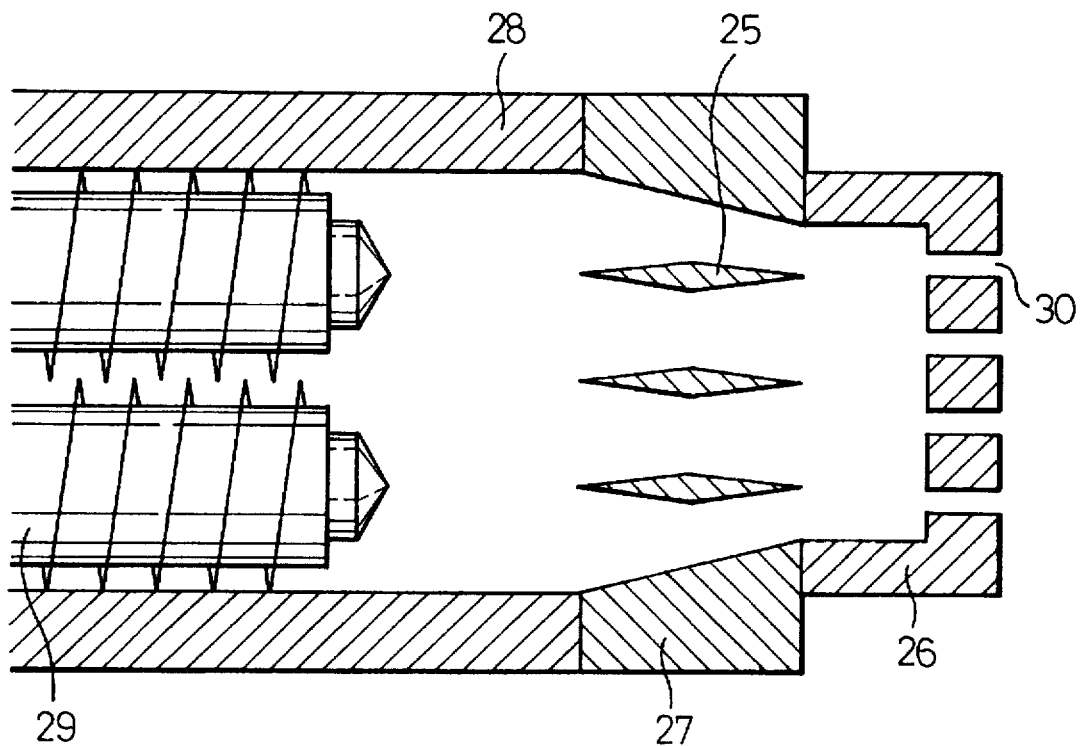
FIG. 6a is a sectional view of the state of attachment of plates of shapes of two joined wedges to an adaptor portion.
Figure 6B:
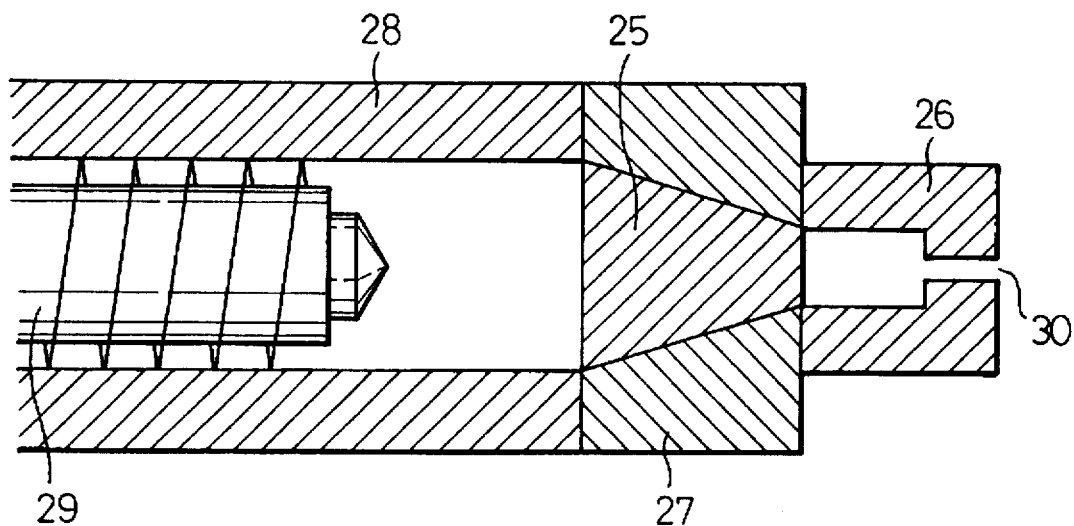
FIG. 6b is a sectional view of FIG. 6a seen from the lateral direction of the extruder.

FIG. 4a is an example of a full flight screw 9 having a mesh-like processed portion 10 on the flight surface, while FIG. 4b is an example of a cylinder 10 having a mesh-like processed portion 12 at the cylinder inner wall. FIG. 4c is an example of a full flight screw 13 having a blade-shaped processed portion 14 on the flight surface, while FIG. 4d is an example of a cylinder 15 having a blade-shaped processed portion 16 at the cylinder inner wall. FIG. 4e is an example of a full flight screw 17 having a blade-shaped processed portion 18 on the flight surface, while FIG. 4f is an example of a cylinder 19 having a blade-shaped processed portion 20 at the cylinder inner wall. FIG. 4g is an example of a screw 21 of a neutral element having a projection shaped processed portion 22, while FIG. 4h is an example of a cylinder 23 having a projection shaped processed portion 24. In forming the projections, it is convenient to use the surface roughness Rz (10 point average roughness of JIS (i.e., Japanese Industrial Standards) standard).

When the fiber length of the reinforcing fibers is long and desiring to comb to filaments, it is preferable to provide columnar or neutral element or other elliptic cylindrical elements without flights at part of the screw and to provide parallel blade-shaped projections in the circumferential direction. The pitch should be made small. For example, the screw 1 shown in FIG. 2a and the screw 21 shown in FIG. 4g are preferable. Taking as an example the screw 1, the specific edge angle (θ) is preferably not more than 60 degrees, particularly preferably not more than 45 degrees. The height (h) of the peaks and valleys of the rough shape is preferably at least 30 times, preferably at least 75 times of the fiber diameter. The pitch (t), that is, the distance between one edge and an adjoining edge, is preferably from 30 to 200 times of the diameter of the reinforcing fibers.

Further, when desiring that the fiber length be relatively short and the bundled fibers be left relatively numerous within the range satisfying the definition of the structure of the present invention, the pitch (t) may be made large or random projections or grooves such as shown in FIG. 4e may be provided in the circumferential direction. Alternatively, the screw 5 or cylinder 7 etc. having the mesh-like processed portions 6 and 8 formed with roughness in the longitudinal and lateral directions as shown in FIGS. 2c and 2d are preferable. By using such processed screws or cylinders, a structure with relatively short fiber lengths and relatively numerous bundled fibers is obtained.

FIGS. 2a to 2d and FIGS. 4a to 4h illustrated cases of an elliptical screw cross-section, but a circular shape is also possible. In the case of an intermeshing twin-screw extruder, an elliptical shape is preferable to maintain the self-cleaning action. Further, use may be made of a combination of different types of processing. Further, to control the fiber length, it is possible to change the length of the control mechanism, change the diameters at the two ends in accordance with need, or combine projections with different pitches and depths. The preferable length of the control mechanism is 0.1 to 10 times, more preferably 0.2 to 5 times the screw diameter.

In the present invention, it is important to provide a control mechanism comprised of a columnar or elliptic cylindrical or other screw and/or cylinder roughened on at least part of their surface and inner wall, respectively, at the areas after the charging of the fiber. The pitch and depth of the roughened portions may be changed depending on the degree of control desired. Further, it is possible to use a so processed screw or processed cylinder alone or to use a combination of the same. When used in combination, the peaks and valleys of the projections may be arranged to intermesh or the peaks may be made to approach each other.

In this way, it is possible to comb the continuous roving and control the fiber length. The above-mentioned control mechanism preferably is provided adjoining the section for feeding the continuous roving. When too far from the feeding portion, then as described in Japanese Unexamined Patent Publication (Kokai) No. 61-211367, the reinforcing fibers will fray and break between the usual screw flights and cylinder before reaching the control mechanism and control of the fiber length and degree of combing will become difficult, and therefore, this is not preferable. Further, as described in Japanese Unexamined Patent Publication (Kokai) No. 4-125110, when provision is made of a usual kneading portion and backflow portion after the feeding portion, the reinforcing fibers will break there, so this is not preferred either. When a kneading portion is provided between the feeding portion and control mechanism, then in the same way as mentioned earlier, the reinforcing fibers will end up breaking and control will no longer be possible. Further, even if a kneading portion is provided after the control mechanism, except when particularly desiring to shorten the fiber length, the fiber will end up breaking, so this is not preferred either.

The charging portion for the continuous roving is provided downstream of the melting portion of the plastic, so the roving is fed into the melted plastic. When fed at the same time as the plastic, then the fibers will break at the time of melting of the plastic and control will no longer be possible, and therefore, this is not preferred.

The extruder usable in the present invention is not particularly limited, but a multi-screw extruder such as a modular twin-screw extruder is convenient. As a multi-screw extruder, the most general twin-screw extruder is preferred, but any type is acceptable, such as a co-rotating, counter-rotating, intermeshing, and non-intermeshing type.

Further, the screws may have deep grooves or shallow grooves or be single flighted, double flighted, triple flighted, etc. A twin-screw extruder, compared with a single-screw extruder, enables independent control of the amount of plastic supplied and the rotational speed of the screws, so enables easy control of the amount of addition of the reinforcing fibers. Further, if a modular construction, there is the advantage of the ease in provision of a control mechanism for controlling the degree of combing and fiber length and ease in changing the position of the same.

From the viewpoint of preventing a deterioration in the physical properties and defective appearance due to volatile components evaporating from the thermoplastic resin or fiber or air bubbles caught among the reinforcing fibers, it is preferable to provide a vent port after the control mechanism used for controlling the degree of combing and fiber length.

Further, according to the present invention, by correcting the spiral flow, caused by the screw in the mixed melt of the reinforcing fibers and thermoplastic resin controlled in degree of combing and fiber length by the control mechanism, by plates provided inside the cylinder between the front end of the screw and the die, the problem of the unstable fluid motion at the time of extrusion of the mixed melt can be eliminated and a fiber reinforced thermoplastic resin structure superior in surface smoothness, i.e., not having a rough surface of the extrudate, can be obtained.

The plates preferably used in the present invention are for correcting the spiral flow of the mixed melt extruded by the screw in the extruder and may be of any shape so long as they have that effect, but it is preferable from the viewpoint of preventing buildup of the reinforcing fibers at the plates that at least part of the plates be wedge shaped, in particular, that the side at the supply of material in the extruder be wedge shaped.

Figure 7A:
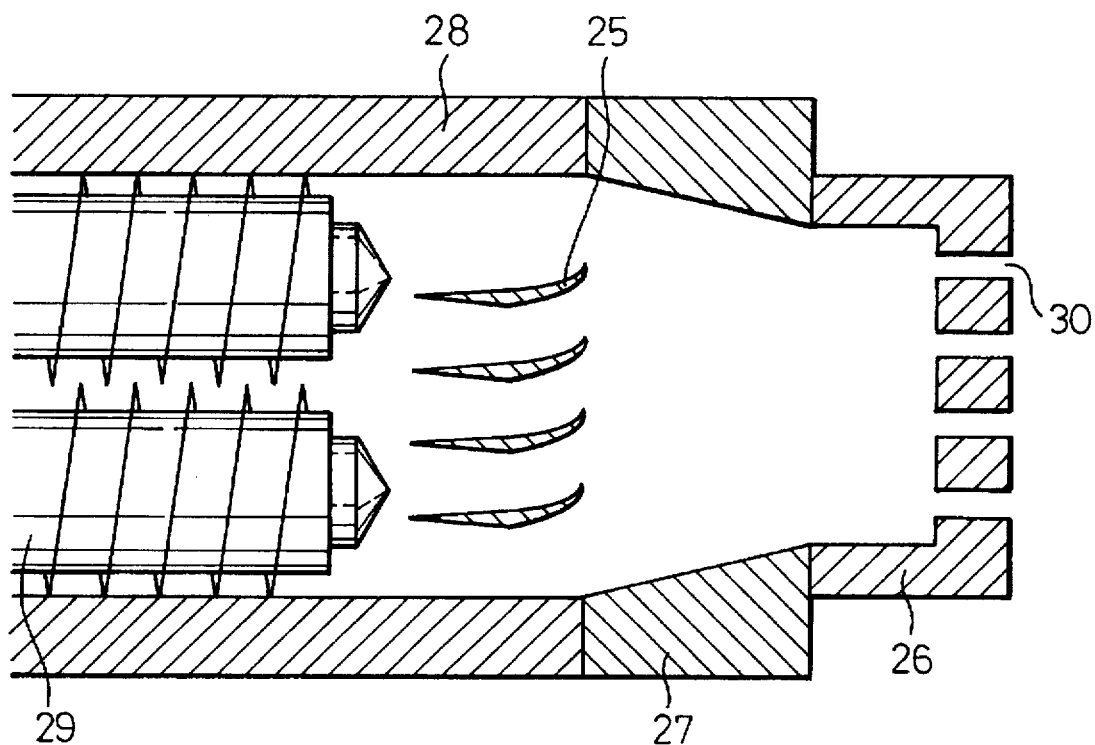
FIG. 7a is a sectional view of the state of attachment of plates of a curved shape to the inside of the cylinder in front of the screw in a twin-screw extruder as seen from above the extruder.
Figure 7B:
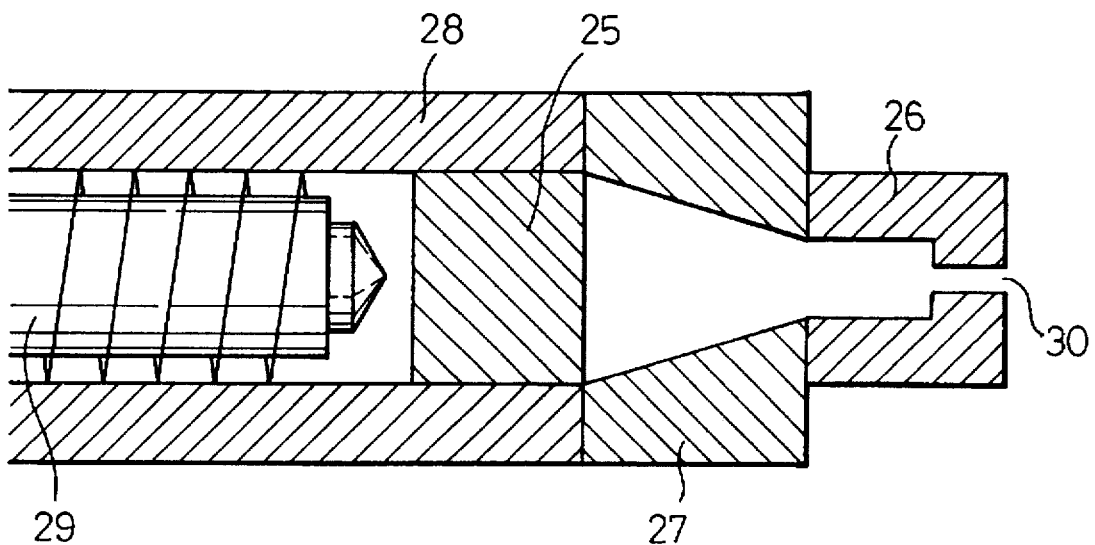
FIG. 7b is a sectional view of FIG. 7a seen from the lateral direction of the extruder.

The angle of the wedge is preferably not more than 90 degrees, more preferably not more than 60 degrees, in view of preventing buildup of reinforcing fibers on the plates. Further, the plates may be curved to more effectively correct the spiral flow. The type of the curving is not particularly limited, but mention may be made of a plate curved to a shape of an arc, part of an ellipse, parabola, etc. over its entire area, a plate curved to a shape of an arc, part of an ellipse, parabola, etc. at just the extruder side, a plate curved to a shape of an arc, part of an ellipse, parabola, etc. at just the discharge side, etc. A plate 25 curved to a shape of part of an ellipse at just the discharge side, shown in FIGS. 7a and 7b, is preferable in terms of the control of the fluid motion of the plastic. The direction of curving is also not particularly limited, but it is preferable to curve it in the direction of rotation of the screw and in a direction of a high correction effect in accordance with the depth of intermeshing of the screw of the extruder. Further, plates with different directions of curving may be combined in use.

The length of the plates in the screw axial direction is at least 0.2 in terms of the L/D of the screw, particularly preferably at least 0.4, in view of the effect of control of the spiral flow.

The material of the plates usable in the present invention is not particularly limited and use may be made of known materials, but general steel or the steel processed for wear resistance used in cylinders, screws, etc. of extruders, are preferable in view of the superiority in wear resistance for the reinforcing fibers. Further, super rigid materials are preferable from the viewpoint of the wear resistance for the reinforcing fibers, in particular, ceramics are preferred.

Regarding the position of mounting of the plates, any position is possible in the cylinder barrel of the extruder between the front end of the screw and the die, but placement at a position at least 0.1, preferably at least 0.3, in terms of the L/D of the screw, from the front end of the screw is preferable in terms of suppressing the spiral flow caused by the screw. The number of the plates is not particularly limited, but from the viewpoint of resistance to clogging by the reinforcing fibers, a number is preferred which gives an area occupied by the plates, in any cross-section perpendicular to the screw axis where the plates are placed, of not more than 50% of the barrel cross-section, preferably not more than 30%.

When a plurality of plates are attached, the distance between them may be equal or irregular, but it is preferable that the distance between plates be greater than the average fiber length of the reinforcing fibers in the extrudate comprised of the reinforcing fibers and the thermoplastic resin in view of preventing the clogging between plates by long reinforcing fibers.

The direction of attachment of the plates is not particularly limited, but the plates may be attached in a direction parallel to the screw axis (angle with screw axis of 0 degree) or inclined from the parallel direction in a range of 0 to 45 degrees.

Figure 8A:
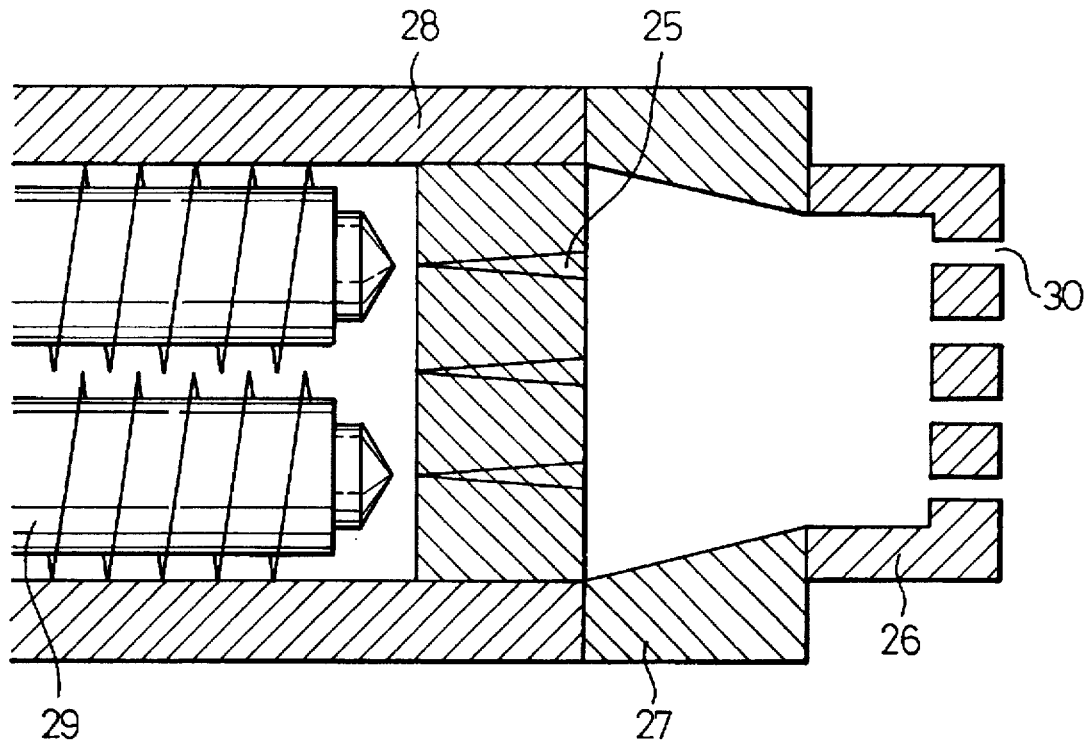
FIG. 8a is a sectional view of the state of attachment of a plurality of plates in a lattice to the inside of the cylinder in front of the screw in a twin-screw extruder as seen from above the extruder.
Figure 8B:
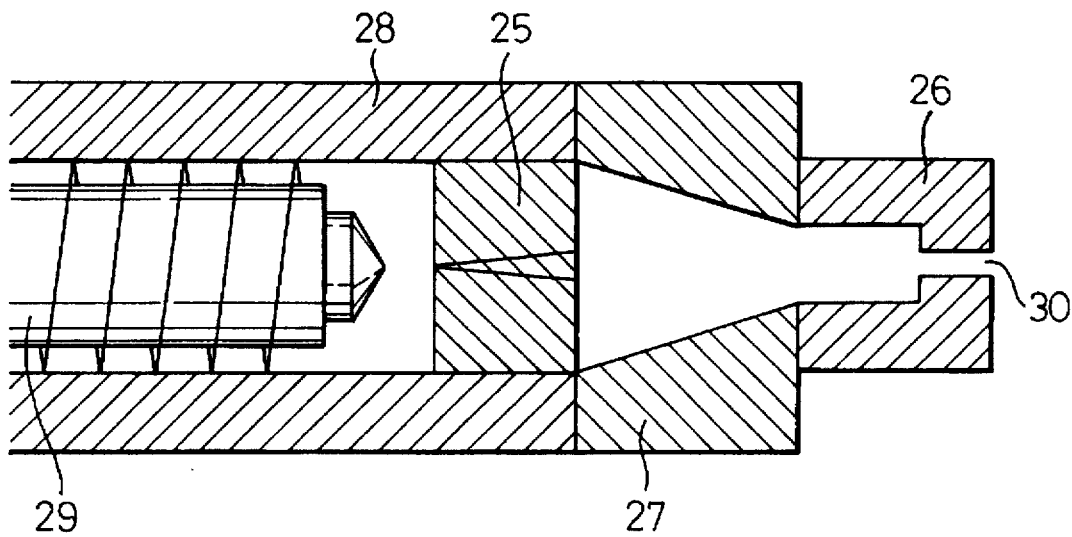
FIG. 8b is a sectional view of FIG. 8a seen from the lateral direction of the extruder.
Figure 9:
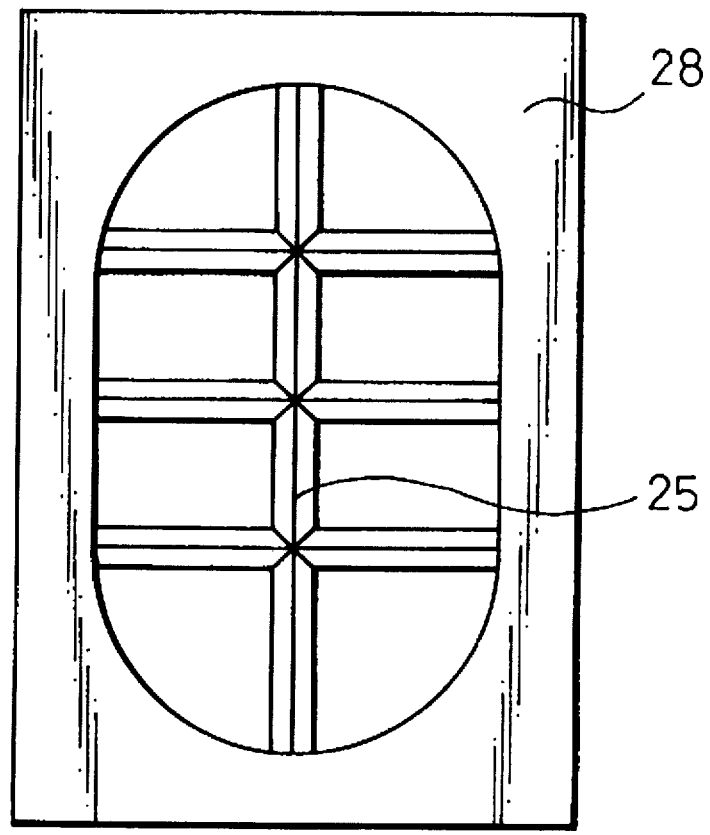
FIG. 9 is a sectional view of an extruder cylinder barrel 28 showing from the upstream side the section of the downstream side between the front end of the screw 29 and the plate 25 in FIG. 8.
Figure 10A:
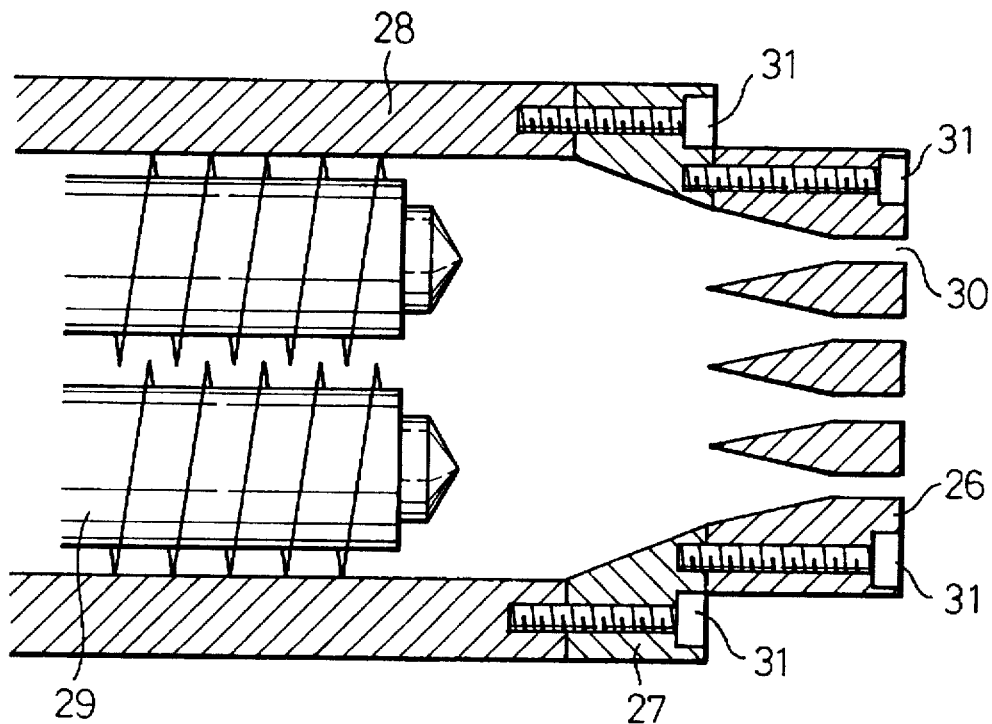
FIG. 10a is a sectional view of the state of attachment of a die assembly of the present invention to a twin-screw extruder through an adaptor as seen from above the extruder.
Figure 10B:
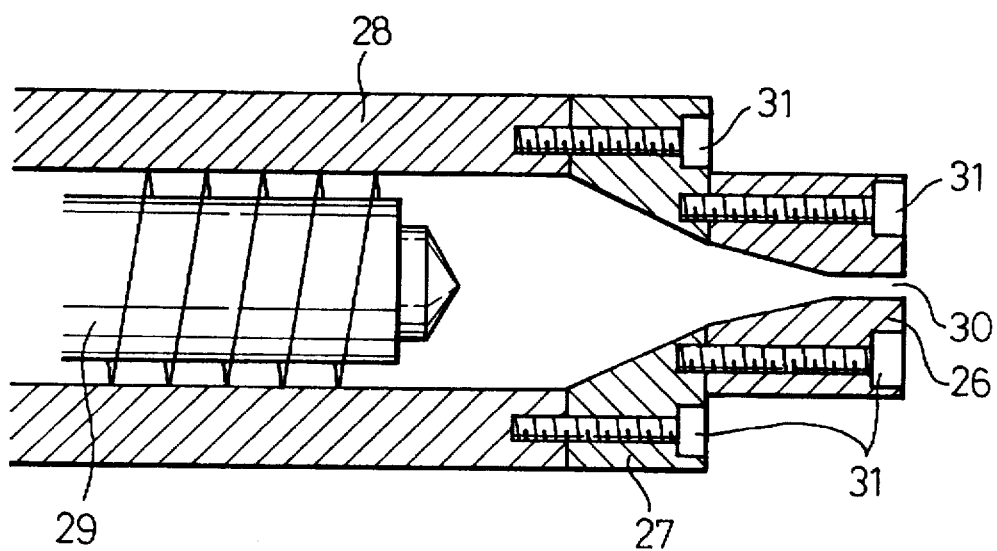
FIG. 10b is a sectional view of the state of attachment of the die of the present invention to the twin-screw extruder through the adaptor as seen from the lateral direction of the extruder.
Figure 11A:
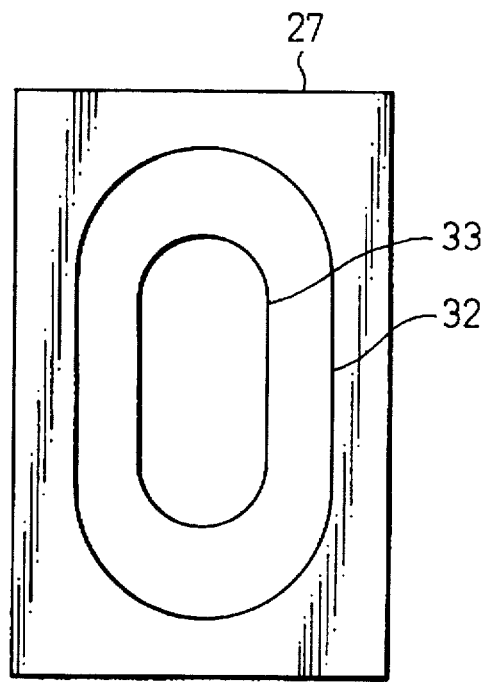
FIG. 11a is a view of the adaptor in FIG. 10a seen from the extruder side.
Figure 11B:
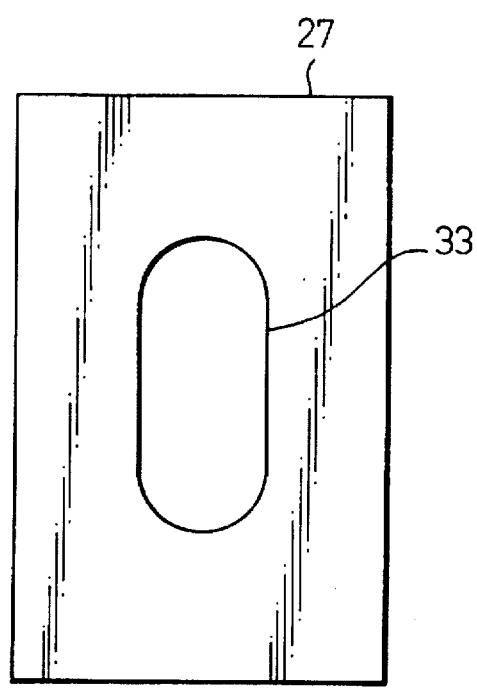
FIG. 11b is a view of the adaptor seen from the die side.
Figure 11C:
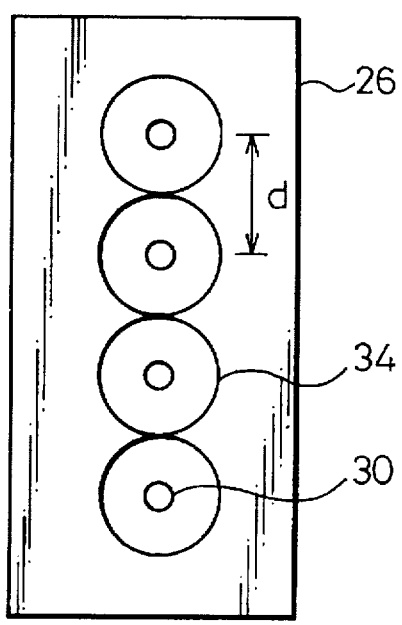
FIG. 11c is a view of the die in FIG. 10a seen from the adaptor side.
Figure 11D:
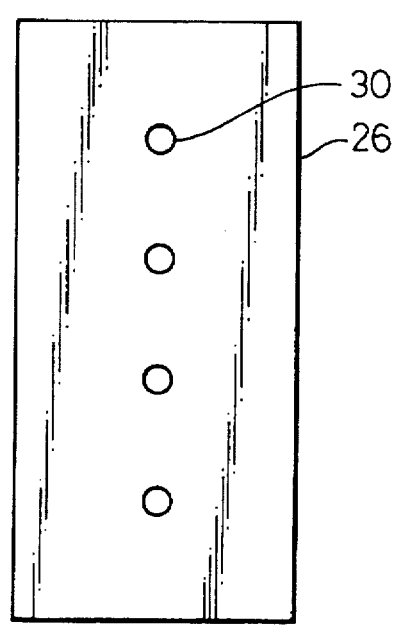
FIG. 11d is a view of the die seen from the discharge side.

Further, to more efficiently correct the spiral flow, a plurality of plates may be used in numerous stages at different mounting positions or may be combined in a lattice. As cases of combination in a lattice, mention may be made of a combination of vertical plates and horizontal plates as shown in FIGS. 8 and 9, a combination of vertical plates inclined from the vertical axis in a small range from 90 degrees, preferably a range of 5 to 60 degrees, and horizontal plates, a combination of horizontal plates so inclined and vertical plates, etc.

Typical examples of the plates preferably used in the production of the fiber reinforced thermoplastic resin structure of the present invention are shown in FIGS. 5 to 8. FIG. 5a is a sectional view of the state of attachment of plates 25 of the present invention in wedge shapes to the inside of the cylinder barrel 28 in front of the screw 29 in a twin-screw extruder as seen from above the extruder. FIG. 5b is a sectional view of FIG. 5a seen from the lateral direction of the extruder. FIG. 6a is a sectional view of the state of attachment of plates 25 of two joined wedge shapes to an adaptor 27 portion as seen from above the extruder, while FIG. 6b is a sectional view of FIG. 6a seen from the lateral direction of the extruder. Here, the adaptor 27 is a device attached between the extruder body and the die 26 for mounting the die 26. FIG. 7a is a sectional view of the state of attachment of plates 25 of a curved shape to the inside of the cylinder barrel 28 of the extruder in front of the screw 29 in a twin-screw extruder as seen from above the extruder. FIG. 7b is a sectional view of FIG. 7a seen from the lateral direction of the extruder. FIG. 8a is a sectional view of the state of attachment of a plurality of plates 25 in a lattice to the inside of the cylinder barrel 28 in front of the screw 29 in a twin-screw extruder as seen from above the extruder, while FIG. 8b is a sectional view of FIG. 8a seen from the lateral direction of the extruder. FIG. 9 is a sectional view of an extruder cylinder barrel 28 showing from the upstream side the section of the downstream side between the front end of the screw 29 and the plate 25 in FIG. 8. The plates 25 are attached to the inside of the extruder cylinder barrel 28 or the portion of the adaptor 27 in front of the screw 29 of a twin-screw extruder. The spiral flow of the mixed melt extruded from the screw 29 is corrected by the plates 25 and the melt is discharged from the discharge port 30 of the die 26 attached through the adaptor 27 or directly to the extruder.

In the present invention, during the production of the pellet form of the fiber reinforced thermoplastic resin structure, to prevent breakage of the reinforcing fibers at the die portion and clogging of the die holes by the reinforcing fibers when stranding the mixed melt of the reinforcing fibers and thermoplastic resin controlled in degree of combing and fiber length, obtained from the control mechanism, by a die, it is possible to use an extrusion die having a die holes having a frustoconical shape and/or land portions having parallel portions of a fixed diameter following the same so as to reduce the breakage of the reinforcing fibers at the die and to prevent buildup of the reinforcing fibers at the die portion due to that shape and thereby to strand the fiber reinforced thermoplastic resin more stably without disturbing the fiber length of the mixed melt of the reinforcing fibers and thermoplastic resin controlled in degree of combing and fiber length.

The die preferably used in the present invention has a plurality of through holes. The through holes have frustoconical shapes and have a value of R/r greater than 1 when the radius of the circle formed by a through hole at the extruder side and the discharge section side are R and r, respectively. The circles formed by the through holes at the extruder side cover at least 90% of the front end of the extruder to which the die is provided or the sectional area of the discharge side of the adaptor.

The extruder and the die assembly of the present invention may be connected by direct attachment of the assembly to the front end of the extruder or attachment through an adaptor. The construction and material of the adaptor are not particularly limited. Attachment is possible by an adaptor of a known construction and/or material, but a construction with no retention portions is preferable in view of preventing clogging of the die holes. Further, a method which smooths the surface roughness of the wall of the adaptor along which the plastic flows by the method as for example disclosed in Japanese Unexamined Patent Publication (Kokai) No. 5-220811 is preferable. It is particularly preferable that the average centerline roughness Ra by the replica method be $\leq 5$ μm. As a method achieving a satisfactory surface roughness when making the through holes in the adaptor, electrodischarge machining and reaming after machining are preferred.

The through holes of the die holes in the present invention are frustoconical in shape. The value of R/r is greater than 1 when the radius of the circles formed by a through hole at the extruder side and the discharge section side are R and r, respectively. Further, the circles formed by the through holes at the extruder side cover at least 90% of the front end of the extruder to which the die is provided or the sectional area of discharge side of the adaptor, preferably at least 95%. The "cone" of the frustoconical shape referred to in the present invention may be a mathematically conical shape or a substantially conical shape with a curved side cross-section. In the case of a substantially conical shape, it is preferable that the curve at the side cross-section be one which protrudes inward.

Further, in the present invention, a parallel land portion of a fixed diameter may be provided before a conical through hole of the die. The land portion is for stabilizing the flow of the mixture of the reinforcing fibers and the plastic and is not particularly limited in length, but usually when using as a unit the ratio L/D of the diameter D of the land (which equals the radius r of the die outlet port) and the length L of the land, an L/D of 1 to 50, particularly 3 to 10, is preferred.

When the distance d between centers of the circles formed by the adjoining through holes of the die on the extruder side is not more than 10 mm, it is possible to further reduce the buildup of the long reinforcing fibers at the partition portion of the two through holes. Further, to prevent buildup of reinforcing fibers at the partition portion between adjoining die holes, it is preferable that the frustoconical shapes forming the through holes partially overlap. The overlapping portions are preferably left empty or are provided with further wedge shaped partition plates to prevent buildup of reinforcing fibers in the through holes.

Further, to prevent buildup of the reinforcing fibers due to retention portions and damage to the reinforcing fibers due to sudden changes in the flow path when the mixture of the reinforcing fibers and the plastic flows in the die, it is preferable to use a die in which at least part of the through holes at the extruder side of the die are enlarged in size so that the shape of the front end of the extruder to which the die is attached or the cross-section at the discharge side of the adaptor and the shape of the holes formed by the through holes at the extruder side of the die match.

Typical examples of the die assemblies used in the production of the pellet form fiber reinforced thermoplastic structure in the present invention are shown in FIG. 10 to FIG. 16. FIG. 10a is a sectional view of the state of attachment of a die assembly of the present invention to a twin-screw extruder through an adaptor 27 as seen from above the extruder. FIG. 10b is a sectional view of the state of attachment of the die 26 of the present invention to the twin-screw extruder through the adaptor 27 as seen from the lateral direction of the extruder. FIG. 11a is a view of the adaptor 27 in FIG. 10a seen from the extruder side, FIG. 11b is a view of the adaptor 27 seen from the die side, FIG. 11c is a view of the die 26 in FIG. 10a seen from the adaptor side, and FIG. 11d is a view of the die 26 seen from the discharge side. The die assembly is attached through the adaptor 27 by bolts 31 to the extruder cylinder 28 provided with the screw 29. The adaptor 27 has adaptor inlet holes 32 at the face seen from the extruder side and adaptor outlet holes 33 at the face seen from the discharge side. The adaptor inlet holes 32 and the adaptor outlet holes 33 form through holes. The die 26 has die inlet holes 37 at the face seen from the adaptor side and die outlet holes 30 at the face seen from the discharge side. Through holes are formed by the die inlet holes 34 and the die outlet holes 30. A plurality of through holes are provided at a center distance d from the adjoining through holes.

FIGS. 12 to 16 are views showing typical constructions of the dies in the present invention, with A being views seen from the extruder side, B cross-sectional views seen from the lateral sides, and C views seen from the discharge side.

Figure 12A:
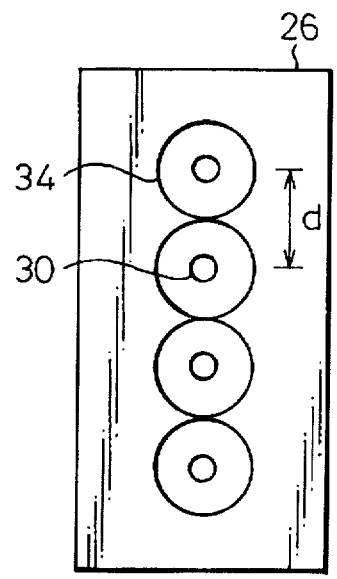
FIG. 12a is a view of a die of a preferable embodiment of the invention seen from the extruder side.
Figure 12B:
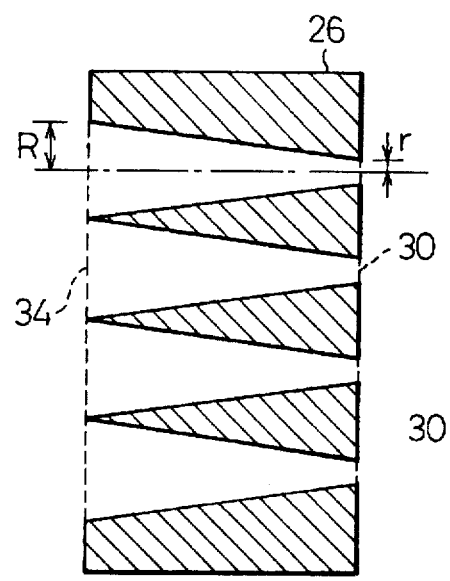
FIG. 12b is a sectional view of the same seen from the side.
Figure 12C:
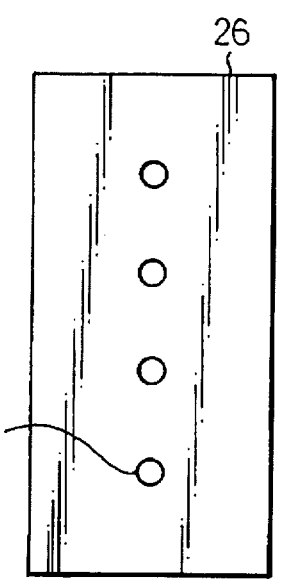
FIG. 12c is a view of the same seen from the discharge side.
Figure 13A:
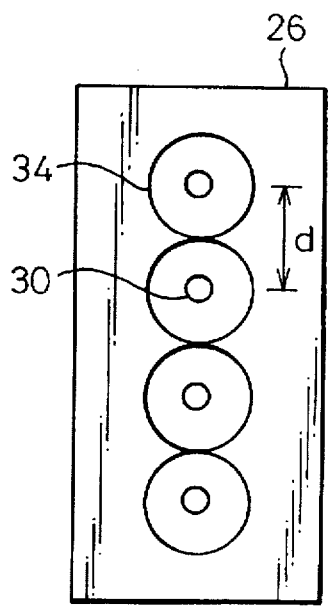
FIG. 13a is a view of a die of a preferable embodiment of the invention seen from the extruder side.
Figure 13B:
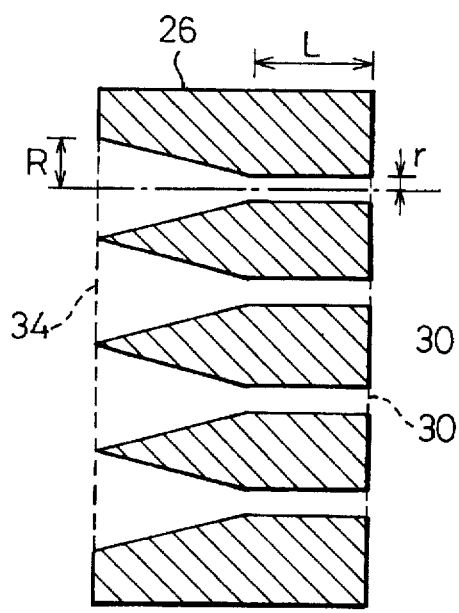
FIG. 13b is a sectional view of the same seen from the side.
Figure 13C:
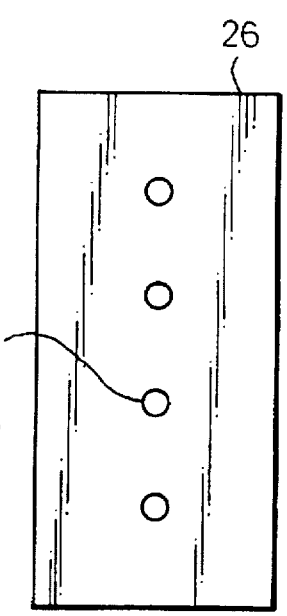
FIG. 13c is a view of the same seen from the discharge side.
Figure 14A:
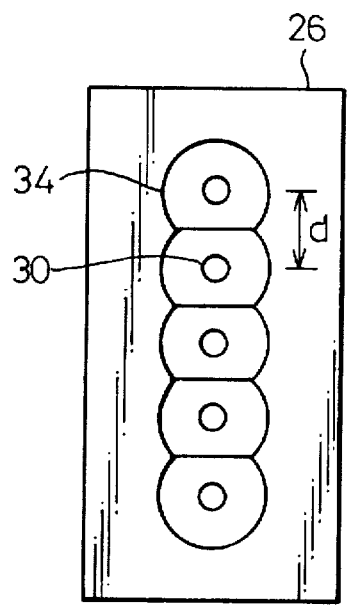
FIG. 14a is a view of a die of a preferable embodiment of the invention seen from the extruder side.
Figure 14B:
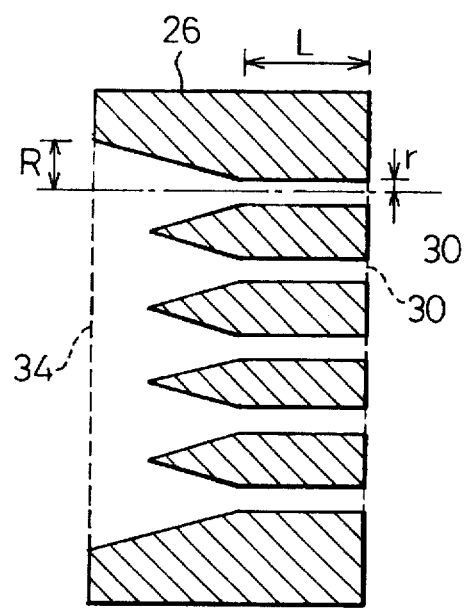
FIG. 14b is a sectional view of the same seen from the side.
Figure 14C:
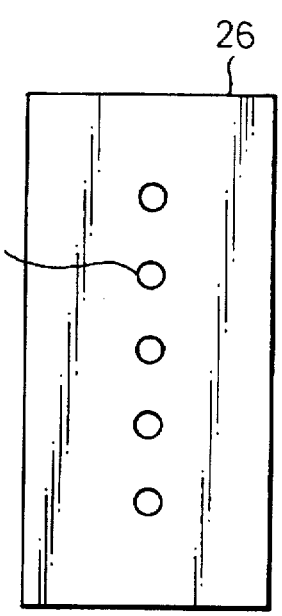
FIG. 14c is a view of the same seen from the discharge side.
Figure 16A:
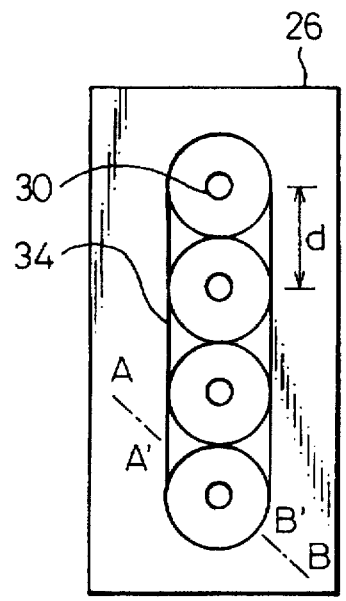
FIG. 16a is a view of a die of a preferable embodiment of the invention seen from the extruder side.
Figure 16B:
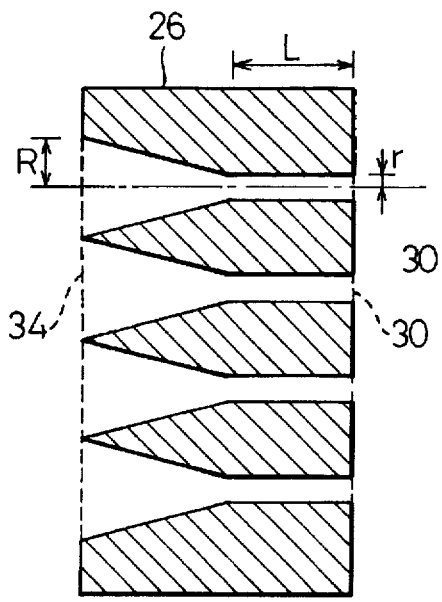
FIG. 16b is a sectional view of the same seen from the side.
Figure 16C:
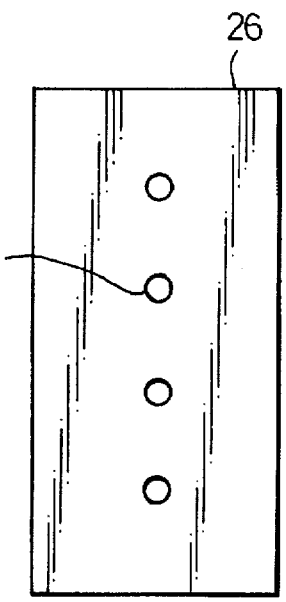
FIG. 16c is a view of the same seen from the discharge side.
Figure 16D:
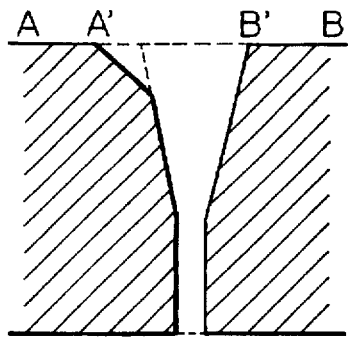

FIGS. 12a to 12c show an example of a die formed with through holes having a frustoconical shape by the die inlet holes 34 of the radius R and the die outlet holes 30 of the radius r. FIGS. 13a to 13c show an example of a die having funnel shaped through holes comprised of die inlet holes 34 of the radius R and land portions of the land diameter r and land length L, FIGS. 14a to 14c show a die having funnel shaped through holes in which the frustoconical shapes forming the through holes partially overlap, FIGS. 15a to 15c show an example of the die of FIGS. 14a to 14c in which wedge shaped partition plates 35 are provided to partition the adjoining through holes at the empty locations formed as a result of the partial overlap of the frustoconical shapes, and FIG. 15d is a perspective view of a wedge shaped partition plate 35. FIGS. 16a to 16c show an example of the die of FIGS. 13a to 13c in which the inlet holes 34 of the die are enlarged so as to match with the shape of the discharge holes of the front end of the extruder or the outlet holes of the adaptor, and FIG. 16d is a sectional view along A-B in FIG. 16a.

The strand-form fiber reinforced plastic structure obtained by the above-mentioned die assembly may be made into a pellet-form fiber reinforced plastic structure by pelletizing by a known method. The pelletizing is preferably performed, as shown in for example Japanese Examined Patent Publication (Kokoku) No. 41-20738, by the method of cooling the strands and then cutting them into pellets or the method of cutting the strands to predetermined dimensions immediately after extrusion from the die. Further, the die assembly of the present invention may be used together with the plates for correcting the spiral flow caused by the screw mentioned above.

The fiber reinforced thermoplastic resin pellets of the present invention may be used for injection molding, injection press molding, extrusion of tubes, pipes, etc., blow molding, and other known molding processes and are superior in fluidity compared with even the conventional pultrusion method. At the time of molding, it is preferable to make the nozzles and gate shapes larger and to make the depth of the grooves of the screws of the molding machines greater than the size of the pellets so as to keep down damage to the reinforcing fibers.

A feature of the process of production of the present invention is that alloying of known thermoplastic resin and addition of various additives are simultaneously possible. The fiber reinforced thermoplastic resin structure of the present invention may be given desired properties in accordance with their object of use by mixing in known substances generally used for thermoplastic resin, such as antioxidants, heat resistance stabilizers, ultraviolet absorbants, and other known stabilizers, antistatic agents, flame retardants, flame retardant adjuvants, dyes, pigments, and other coloring agents, lubricants, plasticizers, crystallization accelerators, crystal nucleating agents, etc. Further, it is possible to simultaneously mix in glass flakes, glass powder, glass beads, silica, montmorillonite quartz, talc, clay, alumina, carbon flakes, wollastonite, mica, calcium carbonate, metal powder, and other inorganic fillers.

Figure 18:
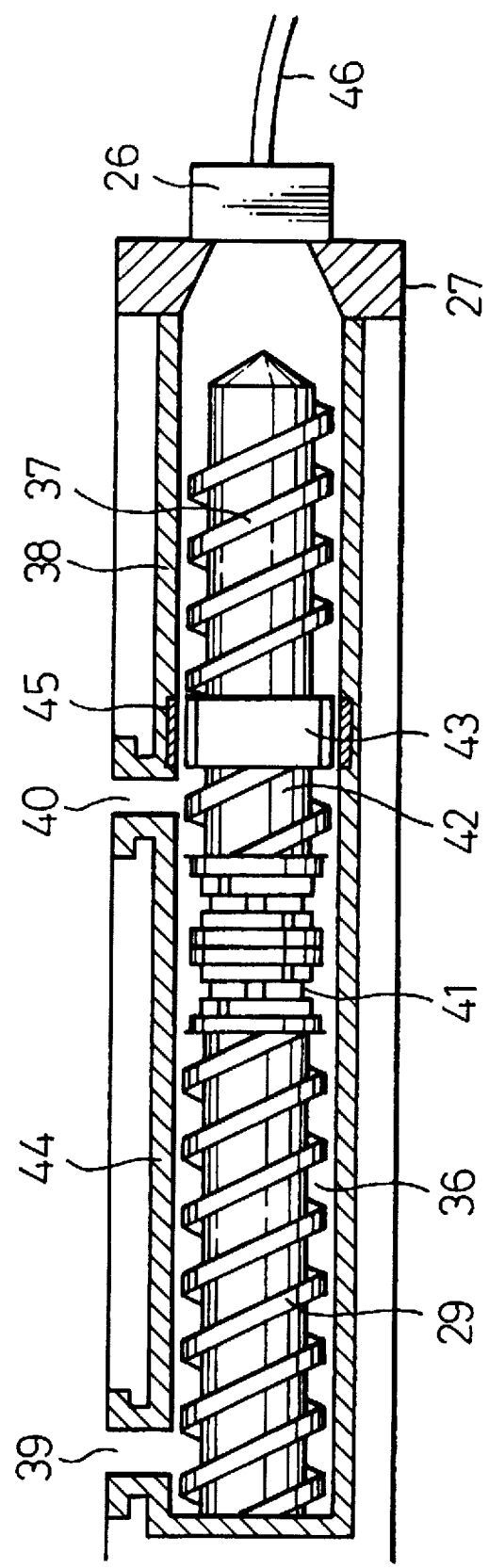
FIG. 18 is an overall sectional view of an extruder provided with two supply ports which is preferably used in the present invention.

Next, a specific preferable example of the process for production of the present invention will be explained with reference to the drawings. FIG. 18 is a cross-sectional view of the entire double flighted screw type twin-screw extruder preferably used in the present invention. The thermoplastic resin is fed from the first feed port 39 and is melted while being transported in the extrusion direction by the screw 29. The thermoplastic resin is completely melted in the kneading zone 41. After this, the fiber in the roving state is fed from the reinforcing fiber feeding port 40. The molten thermoplastic resin and fiber are sent to the front end of the screw by the screw comprised of the forward full flights 42. The fibers are combed and the fiber length controlled by the control mechanism 43 adjoining the charging port 40, then the mix is passed through the through holes of the adaptor 27 and die 26 to extrude the fiber reinforced thermoplastic resin structure 46 and thereby obtain the final fiber reinforced thermoplastic resin structure. Also, it is possible to form the roughened surface 45 on the cylinder inner wall 38 corresponding to the screw roughed surface 43. Further, to correct the spiral flow caused by the screw, it is possible to attach the plates illustrated in FIGS. 5 to 9.

EXAMPLES

The present invention will be explained in further detail below using Examples, but the invention is not limited to the same. The figures for the mechanical properties shown in the Examples and Comparative Examples are mean values of measurements taken from 10 samples.

In evaluating the Izod impact strength, measurement was performed in accordance with ASTM D-256. The flexural modulus was evaluated by measurement in accordance with ASTM D-790. In the case of fiber reinforced thermoplastic resin pellets, test pieces were prepared in accordance with the above standards by injection molding. At that time, to evaluate the pellet fluidity, the lower limit pressure of molding during the injection molding was measured and used as an index. In the case of a sheet, test pieces were cut out from the sheet and measured. The fibers in structures were observed by placing ten pieces of pellets or part of a sheet (10 cm square portion at center of sheet or, in the case of a sheet having a width of less than 10 cm, a rectangle having such a length that the area thereof is 100 cm$^2$) in a 500° C. electric furnace and burning off just the plastic to measure the fiber content. Further, at least 1000 fibers in the ash were examined by a microscope, the weight average fiber length (Lw) and number average fiber length (Ln) were found from the distribution of fiber lengths, and the ratio Lw/Ln was found. Note that the corner portion of the shaped article (1 cm square portion at outer circumference of sheet) was similarly burned to measure the fiber content.

The state of dispersion of the reinforcing fibers was evaluated by further melt compressing the pellets or sheet and giving a poor ("X") rating to cases of separation of the reinforcing fiber and plastic and a good ("O") rating to cases of no separation of the reinforcing fibers and thermoplastic resin.

As a simple way of evaluating the degree of combing of the fibers, a soft X-ray photograph was taken of a structure processed to a thickness of 1 mm. A poor ("X") rating was given to the case where the portion of uneven concentration exceeded 3 mm square, a fair ("Δ") rating to the case of a portion of less than 3 mm, and a good ("O") rating to the case of no uneven portions. Alternatively, the degree of combing was found by examining under a microscope a cross-section of the structure cut by a razor and determining the ratio of fibers in bundles of 10 or more in 1000 fibers.

The relative viscosity of the plastic was measured at 25° C. after dissolving it in o-chlorophenol at a concentration of 0.5 g/dl.

Example 1 and Comparative Examples 1 to 3

Use was made of a co-rotating twin-screw extruder (TEX30 made by Japan Steel Works Ltd.) having two supply ports in the extrusion direction, a screw diameter of 30 mm, and an L/D of 45.5 as shown in FIG. 18. Further, use was made of double flighted intermeshing 3.5 mm screws. Between the first plastic feed port 39 and the reinforcing fiber feeding port 40 was provided a screw element 41 comprised of five kneading disks of an L/D of 1 and 45 degree inclination combined in a right-handed and left-handed order. At the discharge side of the reinforcing fiber feeding port 40 was provided, via a full-flight screw 42 of an L/D of 1, an elliptical cross-section kneading element with the processing of FIG. 2a (pitch (t) of 1 mm, blade angle (θ) of 30 degrees, and height (h) of peaks and valleys of 1 mm) and an L/D of 0.75, to form the control mechanism 43. Polyethylene terephthalate pellets (relative viscosity of 1.35) were fed to the plastic feed port 39 by a screw pellet feeder, glass roving of a diameter of 17 μm and a weight of 2200 g per 1000 meters (made by Nippon Electric Glass Co.) was introduced from the fiber feeding port 40, and the mix was extruded in a sheet form from a die in a thickness of 4 mm and a width of 50 mm under conditions of a cylinder temperature of 280° C. and a screw rotational speed of 200 rpm. The sheets were cooled by a casting roll to obtain the fiber reinforced sheet. The content of the glass fibers in the obtained sheets was 25% by weight and the glass fibers were uniformly dispersed (Example 1).

For comparison, using the above-mentioned polyethylene terephthalate powder and chopped strands of a fiber diameter of 17 μm and fiber length of 13 mm, the porous web sheets with a glass fiber content of 25% by weight were prepared using a hand sheet making machine from an aqueous slurry of polyethylene terephthalate powder and chopped strands by the same paper machine process as in Japanese Unexamined Patent Publication (Kokai) No. 3-7307. Five of the web sheets were superposed and press formed at about 280° C. to obtain sheets (Comparative Example 1). Also, using the same method as in Japanese Unexamined Patent Publication (Kokai) No. 63-9511, the same type of polyethylene terephthalate and glass fiber as in Comparative Example 1 were mixed in a Henschel mixer, then were extruded into sheets by a ram extruder to obtain sheets of a glass fiber content of 25% by weight (Comparative Example 2). Further, using the same type of polyethylene terephthalate and glass roving as in the example, the known crosshead die pultrusion was performed. The results were cut into pellets of a length of 13 mm to obtain long fiber reinforced pellets of a glass content of 25% by weight. The pellets were press formed into sheets at about 280° C. (Comparative Example 3).

As shown in Table 1, when the fiber length, distribution, and mechanical properties of the sheets were measured, with the example of the invention, it was found that superior mechanical properties could be obtained, but in Comparative Examples 1 and 2, the specified distribution of fiber length could not be obtained by melt extrusion, so despite the long fiber length, only a low impact strength could be obtained. Further, in Comparative Example 3, the glass roving was not combed, so the plastic and glass fibers separated upon press forming and a uniform sheet could not be obtained, so the mechanical properties could not be evaluated.

TABLE 1

|  | Ex. 1 | Comp. Ex. 1 | Comp. Ex. 2 | Comp. Ex. 3 |
|---|---|---|---|---|
| Process of production |  | Paper machine | Dry process | Pultrusion |
| Fiber content (wt %) | 25 | 25 | 25 | 25 |
| Lw (mm) | 4.9 | 13 | 13 | 13 |
| Lw/Ln | 1.7 | 1.0 | 1.0 | 1.0 |
| Izod impact strength (J/m) with notches | 220 | 121 | 130 | — |
| Flexural modulus of elasticity (MPa) | 8100 | 7500 | 7300 | — |
| State of dispersion of fibers | o | x | x | x |

Examples 2 to 4 and Comparative Examples 4 to 5

The same procedure was followed as in Example 1, except that as the control mechanism 43 of the screw, use was made of a neutral element of an L/D of 0.75 and an elliptical cross-section given the processing of FIG. 2a (pitch (t) of 0.5 mm, blade angle (θ) of 60 degrees, and height (h) of 0.4 mm) or of FIG. 4g (projections giving a surface roughness Rz of 90 μm) and a forward full flight element of an L/D of 1 given the blade processing of FIG. 4e (pitch (t) of 1 mm, blade angle (θ) of 30 degrees, and height (h) of peaks and valleys of 1 mm) and extrusion was performed under conditions of a screw rotational speed of 150 rpm, so as to extrude the melt into sheets. These were cooled by a casting roll to obtain fiber reinforced sheets. For comparison, sheets were formed in the same way using a forward full flight element (Comparative Example 4) without processing instead of the forward full flight element given the processing of Example 4 and a neutral element (Comparative Example 5) without processing instead of the neutral element given the processing of Example 2. As shown in Table 2, in Comparative Examples 4 and 5, the die pressure was high, uneven discharge was caused, the degree of combing of the glass fibers in the sheets was uneven, and the reinforcing fibers and plastic separated when the sheets were melted and compressed, but in Examples 2 to 4, good sheets were obtained.

TABLE 2

|  | Ex. 2 | Ex. 3 | Ex. 4 | Comp. Ex. 4 | Comp. Ex. 5 |
|---|---|---|---|---|---|
| Floor content (wt %) | 27 | 27 | 27 | 27 | 27 |
| Control element | FIG. 2a | FIG. 4g | FIG. 4e | None Forward full flight | None Neutral |
| LW | 5.3 | 4.6 | 8.0 | 24 | 19 |
| Lw/Ln | 2.1 | 2.3 | 2.6 | 3.5 | 3.1 |
| Die pressure (MPa) | 1.1 | 1.4 | 1.5 | 2.1 to 2.5 | 1.8 |
| Discharge stability | o | o | o | x | Δ |
| State of dispersion of fibers | o | o | o | x | x |
| Degree of combing of fibers (simple evaluation method) | o | o | o | x | Δ |

Example 5 and Comparative Example 6

The same procedure was followed as in Example 1, except that use was made of glass roving of a diameter of 13 μm and a weight of 1100 g per 1000 meters (made by Nippon Electric Glass Co.) and extrusion was performed through a sheet die under conditions of a cylinder temperature of 290° C. and a screw rotational speed of 200 rpm. The sheets were extruded at a thickness of 5 mm, a width of 80 mm, and a speed of 80 cm/minute, were cooled by a cooling belt, then were cut into lengths of 300 mm to obtain fiber reinforced plastic sheets. The obtained sheets were dried at 130° C. for 6 hours, then were compression molded at a press temperature of 280° C. and were measured for their mechanical properties, fiber lengths, etc. The content of glass fiber of the sheets obtained was 45% by weight (Example 5).

Further, sheets of polyethylene terephthalate the same as in Example 1 pressed to a thickness of 1.5 mm and mats of chopped strands of a basis weight of 100 g/m² and a fiber length of 50 mm were superposed to give a content of glass fibers of 45% by weight, then were press molded at about 280° C. to obtain a sheet of a thickness of 5 mm, a length of 250 mm, and a width of 250 mm (Comparative Example 6). The sheet of Comparative Example 6 was dried, then compression molded in the same way as in Example 5 and measured for mechanical properties and fiber length.

As shown in Table 3, in the Example of the present invention, it was possible to obtain fiber reinforced thermoplastic resin sheets superior in mechanical properties and superior in fluidity of the fibers to the corner portions as well. In Comparative Example 7, high mechanical properties could be obtained, but the degree of combing of the fibers was poor and the fluidity was poor, with little content of fibers at the corner portions.

TABLE 3

|  | Ex. 5 | Comp. Ex. 6 |
| --- | --- | --- |
| Lw (mm) | 37 | 49 |
| Lw/Ln | 2.5 | 1.1 |
| State of dispersion of fibers | o | x |
| Degree of combing (%) | 20 | 98 |
| ⅛" notch izod (J/m) | 200 | 260 |
| Flexural strength (MPa) | 240 | 280 |
| Flexural modulus (MPa) | 14100 | 15100 |
| Fiber content at corners of shaped article (wt %) | 43 | 5 |

Lw: Weight average fiber length in sheets
Ln: Number average fiber length in sheets Examples 6 to 7 and Comparative Examples 7 to 8

The same procedure was followed as in Example 5 except for using polybutylene terephthalate (PBT1100S made by Toray Industries) and carbon fiber ("Torayca" T300B made by Toray Industries) roving so as to produce fiber reinforced plastic sheets of a content of fiber of 20% by weight and a sheet thickness of 4 mm. These were extruded at a speed of about 100 cm/minute, cooled by a cooling belt, then cut into lengths of 300 mm to obtain fiber reinforced plastic sheets (Example 6). Further, the same apparatus, plastic, and reinforcing fibers were used as in Example 8, except for using an elliptical section neutral screw element of an L/D of 0.75 and given the mesh processing of FIG. 2c (pitch (t) of 0.5 mm, blade angle (θ) of 30 degrees, and height (h) of peaks and valleys of 0.5 mm) instead of the elliptical section neutral element used as the control mechanism 43 in the extruder of Example 6, so as to obtain fiber reinforced plastic sheets of a sheet thickness of 4 mm in the same way as Example 6 (Example 7).

Further, the same apparatus, plastic, and reinforcing fibers were used as in Example 6 except that in the same extruder as in Example 6, instead of the element of the control mechanism 43, a screw element comprised of five kneading disks of an L/D of 0.75 and an inclination of 45 degrees was provided combined in right-handed and left-handed order, so as to obtain fiber reinforced plastic sheets of a sheet thickness of 4 mm in the same way as in Example 6 (Comparative Example 7). Further, the same apparatus, plastic, and reinforcing fibers were used as in Example 6, except that use was made of a forward full flight screw instead of the element of the control mechanism 43 in the extruder of Example 6, to obtain fiber reinforced plastic sheets of a sheet thickness of 5 mm (Comparative Example 8).

As shown in Table 4, the fiber reinforced plastic sheets of the examples of the invention were all superior in fluidity of the fibers at the time of molding and exhibited high values of mechanical properties. In Comparative Example 8, however, the dispersion of the fibers was non-uniform and the combing ability was insufficient as well, so the content of fiber at the corners was low. Further, in Comparative Example 7, the fiber length in the sheets was short and the mechanical properties of the shaped article low.

TABLE 4

|  | Ex. 6 | Ex. 7 | Comp. Ex. 7 | Comp. Ex. 8 |
| --- | --- | --- | --- | --- |
| Lw (mm) | 8 | 5 | 0.3 | 15 |
| Lw/Ln | 2.0 | 1.8 | 1.3 | 2.2 |
| State of dispersion of fibers | o | o | o | x |
| Degree of combing (%) | 7 | 5 | 0 | 74 |
| ⅛" notch izod (J/m) | 53 | 46 | 35 | 51 |
| Flexural strength (MPa) | 250 | 230 | 200 | 250 |
| Flexural modulus (MPa) | 11300 | 11600 | 10800 | 11700 |
| Fiber content at corners of shaped article (wt %) | 19 | 20 | 20 | 10 |

Lw: Weight average fiber length in sheets
Ln: Number average fiber length in sheets Example 8 and Comparative Examples 9 to 12

The same procedure was followed as in Example 1 to produce long fiber reinforced pellets except that the glass fiber content was made 45% by weight, use was made of the die 4 shown in Table 12 instead of a sheet die, and the mixture was extruded into rods of a diameter of 4 mm, then pelletized into lengths of about 10 mm. For comparison, use was made of the method of using a similar screw arrangement as in Example 8, using a die 6 shown in Table 12 instead of a sheet die, and adding chopped strands of 10 mm length from the fiber charging port (Comparative Example 9), the method of using the die 6 shown in Table 12, using chopped strands of a length of 10 mm, and using a screw element comprised of five kneading disks of an L/D of 0.75 and an inclination of 45 degrees combined right-handed and left-handed instead of the control mechanism 43 (Comparative Example 10), and the method of producing pellets by the known pultrusion method (Comparative Example 11).

As shown in Table 5, in the case of Comparative Example 9, the chopped strands could not wind around the screw, so were not combed, die clogging occurred, and pelletizing was not possible. Further, in Comparative Example 11, when the discharge was raised to 40 kg/h and the strand takeup speed was increased, the strands broke and therefore strands could not be obtained (Comparative Example 12). The pellets of this Example according to the present invention were able to increase the strand takeup speed, and therefore, the pellets were able to efficiently produced and the fluidity of the resultant pellets at the time of molding was good. Despite of the fact that the weight-average fiber lengths in the pellets were short when compared with the pellets produced by a pultrusion method, the mechanical properties of the resultant injection molded articles were comparable to those of pellets produced by a pultrusion method. Furthermore, when the pellets were melt compressed, the pellets of the present Example did not show any separation between the reinforcing fiber and the resin, whereas the separation between the reinforcing fiber and the rein was caused in the case of the pellets of comparative Example 11 produced by a pultrusion method.

TABLE 5

| | Ex. 8 | Comp. Ex. 9 | Comp. Ex. 10 | Comp. Ex. 11 | Comp. Ex. 12 |
|---|---|---|---|---|---|
| Process of production | FIG. 2a element | FIG. 2a element | right/left-handed kneading disks | Pultrusion | Pultrusion |
| Type of fiber | Roving | 10 mm chopped strands | 10 mm chopped strands | Roving | Roving |
| Fiber content (wt %) | 45 | 45 | 45 | 45 | 45 |
| Discharge (kg/h) | 40 | 40 | 40 | 10 | 40 |
| State of discharge | o | Die clogging x | o | o | Strand breakage x |
| Rod | | | | | |
| Lw (mm) | 5.1 | | 0.5 | | |
| Lw/Ln | 2.2 | | 1.6 | | |
| Pellets | | | | | |
| Lw (mm) | 2.9 | | 0.5 | 10 | |
| Lw/Ln | 2.0 | | 1.7 | 1.0 | |
| State of dispersion of fibers | o | | o | x | |
| Lower limit pressure at molding (MPa) Gauge | 2.1 | | 2.0 | 4.5 | |
| Izod impact strength (J/m) with notches | 182 | | 77 | 180 | |
| Flexural modulus (MPa) | 15500 | | 13500 | 15300 | |
| Flexural strength (MPa) | 273 | | 255 | 275 | |

Example 9 and Comparative Examples 13 to 14

The same procedure was followed as in Example 8, but feeding nylon 66 (CM3001 made by Toray Industries) to the plastic feed port and introducing glass roving of a diameter of 13 μm and a weight of 1100 g per 1000 meters (made by Nippon Electric Glass Co.) from the fiber charging port. These were extruded in a strand form under conditions of a cylinder temperature of 290° C. and a screw rotational speed of 200 rpm. The strands were cooled in a water bath, then were cut into lengths of 10 mm to obtain the fiber reinforced plastic pellets. The content of glass fiber in the obtained pellets was 45% by weight. The fiber reinforced plastic pellets were dried by vacuum dryer at 90° C. for 24 hours, then used for injection molding at a cylinder temperature of 290° C. and a die temperature of 80° C.

The same procedure was followed as in Example 9, but a screw element comprised of five kneading disks of an L/D of 0.75 and an inclination of 45 degrees was provided at the discharge side of the reinforcing fiber feeding port as well instead of the control mechanism 43. Otherwise the same apparatus was used as in Example 9. Nylon 66 the same as in Example 9 and glass roving the same as in Example 9, but cut into lengths of 3 mm to form chopped strand type reinforcing fibers, were used and extruded into strands by the known process for production of fiber reinforced plastic pellets. The strands were cooled in the same way as in Example 9, then cut into lengths of 10 mm to obtain fiber reinforced plastic pellets of a glass fiber content of 45% by weight. The pellets were then dried and used for injection molding by the same method as in Example 9 (Comparative Example 13).

Using the same type of nylon 66 and glass roving as in Example 9 and the known crosshead die pultrusion process, strands were obtained which were then cut into pellet lengths of 10 mm to obtain long fiber reinforced pellets of a glass content of 45 percent by weight. In the same way as in Comparative Example 13, the same method was used as in Example 9 to dry the same and then perform injection molding (Comparative Example 14).

As shown in Table 6, in the example of this invention, fiber reinforced plastic pellets superior in the balance of mechanical properties and fluidity could be obtained, but in Comparative Example 13, the fiber length in the pellets was short, so only a low impact strength could be obtained. Further, in Comparative Example 14, while the fiber length in the pellets was long, the degree of combing was poor, so the fluidity at the time of injection molding was poor.

TABLE 6

| | Ex. 9 | Comp. Ex. 13 | Comp. Ex. 14 |
|---|---|---|---|
| Lw (mm) | 2.2 | 0.5 | 10 |
| Lw/Ln | 2.0 | 1.2 | 1 |
| State of dispersion of fibers | o | o | x |
| ⅛" notch izod (J/m) | 230 | 150 | 250 |
| Flexural modulus (MPa) | 12600 | 12000 | 13000 |
| Lower limit pressure at molding (MPa) | 2.2 | 2.0 | 3.7 |

Lw: Weight average fiber length in sheets
Ln: Number average fiber length in sheets

Example 10 and Comparative Example 15

The same method was used as in Example 9, except for using polybutylene terephthalate (PBT1100S made by Toray Industries) and carbon fiber ("Torayca" T-300B made by Toray Industries) roving, to produce fiber reinforced plastic pellets of a fiber content of 20% by weight and a pellet length of 5 mm. These were dried at 110° C. for 12 hours, then used for injection molding at a cylinder temperature of 260° C. and a die temperature of 80° C.

Use was made of the same apparatus, plastic, and reinforcing fibers as in Example 10, except for providing a screw element comprised of five kneading disks of an L/D of 0.75 and inclination of 45 degrees combined in right-handed and left-handed order instead of the control mechanism in Example 10, so as produce and use for injection molding fiber reinforced plastic pellets of a pellet length of 5 mm in the same way as in Example 10 (Comparative Example 15).

As shown in Table 7, the fiber reinforced plastic pellets of the example of this invention were superior in fluidity at the time of molding and the shaped article had high mechanical properties, but in the case where a screw element processed to improve the combing ability was not used, that is, in Comparative Example 15 where use was made of kneading disks, the fiber length in the pellets became shorter and the mechanical properties of the shaped article were low.

In each Example, no separation between the reinforcing fiber and the resin occurred, when the pellets were melt compressed, and the reinforcing fibers were uniformly dispersed in the pellets.

TABLE 7

|  | Ex. 10 | Comp. Ex. 15 |
|---|---|---|
| Lw (mm) | 2.5 | 0.4 |
| Lw/Ln | 1.5 | 1.1 |
| Degree of combing (%) | 15 | 2 |
| ⅛" notch Izod (J/m) | 60 | 40 |
| Flexural modulus (MPa) | 12100 | 11000 |
| Lower limit pressure during molding (MPs) | 2.7 | 2.2 |

Lw: Weight average fiber length in sheets
Ln: Number average fiber length sheets Example 11

A screw and cylinder of L/D of 1 and given the processing of FIGS. 4e and 4f (depth of grooves (h) and pitch (θ) both 1 mm) at positions adjoining the discharge port side of the vent port of an injection molding machine having a full flight screw were used, polybutylene terephthalate resin (relative viscosity of 1.45) was fed from a hopper, and the glass roving of Example 1 was fed from a vent port for injection molding at about 250° C. Further, a comparison was made with the case of no processing (Table 8). The Example of the invention showed good fluidity at the time of molding and no occurrence of defects in the appearance of the shaped article.

TABLE 8

|  | Ex. 11 |
|---|---|
| Fiber content (wt %) | 60 |
| Shaped article |  |
| Lw (mm) | 2.5 |
| Lw/Ln | 1.6 |
| Lower limit pressure during molding (MPa) Gauge | 6.3 |
| Appearance of shaped article | Good |
| State of dispersion of fibers | o |
| Number of abnormalities in 100 shots | None |
| Izod impact strength (J/m) with notches | 180 |
| Flexural modulus (MPa) | 14100 |
| Flexural strength (MPa) | 210 |

Example 12 and Comparative Example 17

Blow molding was performed in the same way as with Example 11 except for use of a full flight screw blow molding machine. Further, a comparison was made with the case of use of a full flight screw with no processing instead of the processed full flight screw in Example 12 (Comparative Example 17). In the Example of the invention, the Lw in the molten parison was 4.9 mm, the Lw/Ln was 2.1, the discharge was stable, and an excellent shaped article could be obtained, but in Comparative Example 17, the Lw was 8.9 mm, the Lw/Ln was 3.4%. Further, the parison did not hang down vertically, but swung to the left and right, so a large amount of burrs were caused.

A part of the molded article obtained by a blow molding was cut out, followed by melt compressing and the dispersion conditions of the reinforced fibers were evaluated. In the Example according to the present invention, no separation between the reinforcing fibers and the resin occurred and the reinforcing fibers were uniformly dispersed in the blow molded articles. Contrary to this, when a part of the molded article of the Comparative Example was cut out, followed by melt compressing, the fibers and the resin were separated and the reinforcing fiber was not uniformly dispersed in the blow molded article of the Comparative Example.

Examples 13 to 16 and Comparative Examples 18 to 20

The same method was used as in Example 8, except for using polybutylene terephthalate (PBT1100S made by Toray Industries), to produce 5 mm long pellets with different fiber contents. These were used for injection molding and the resultant physical properties were measured (Table 9). For comparison, glass roving was fed from the plastic feeding port instead of the fiber feeding port.

In each Example, no separation between the reinforcing fibers and the resin occurred, even when the pellets produced were melt compressed, and the reinforcing fibers were uniformly dispersed in the pellets. Although the good physical properties were obtained in the case of the pellets according to the Examples, in the Comparative Examples, the weight average fiber lengths of the reinforcing fibers were all less than 1 mm and the good physical properties were not obtained.

TABLE 9

|  | Ex. 13 | Ex. 14 | Ex. 15 | Ex. 16 | Comp. Ex. 18 | Comp. Ex. 19 | Comp. Ex. 20 |
|---|---|---|---|---|---|---|---|
| Fiber content (wt %) Rod | 9 | 25 | 45 | 60 | 9 | 25 | 45 |
| Lw (mm) | 7.3 | 6.7 | 5.9 | 4.9 | 0.7 | 0.6 | 0.4 |
| Lw/Ln Pellet | 1.9 | 1.8 | 1.8 | 1.9 | 1.5 | 1.7 | 1.5 |
| Lw (mm) | 5.0 | 4.3 | 4.0 | 3.3 | 0.7 | 0.6 | 0.4 |
| Lw/Ln | 1.7 | 1.6 | 1.5 | 1.6 | 1.6 | 1.7 | 1.6 |
| Izod impact strength (J/m) with notches | 58 | 102 | 160 | 164 | 35 | 68 | 111 |
| Flexural modulus (MPa) | 4250 | 6980 | 12500 | 15400 | 3500 | 6340 | 11300 |
| Flexural strength (MPa) | 135 | 194 | 231 | 236 | 117 | 166 | 198 |
| Mold shrinkage (%) | 0.49 | 0.21 | 0.10 | 0.08 | 0.73 | 0.31 | 0.19 |

Examples 17 to 20 and Comparative Example 21

The same method was used as in Example 8, except for using carbon fiber ("Torayca" T-300B made by Toray Industries) roving, to produce 3 mm long pellets with different fiber contents. These were used for injection molding. For comparison, the fiber was fed from the plastic feeding port as well instead of the fiber feeding port (Table 10).

In each Example, no separation between the reinforcing fibers and the resin occurred, even when the pellets produced were melt compressed, and the reinforcing fibers were uniformly dispersed in the pellets. Although the good physical properties were obtained in the case of the pellets according to the Examples, in the Comparative Examples, the weight average fiber lengths of the reinforcing fibers were all less than 1 mm and the good physical properties were not obtained.

TABLE 10

|  | Ex. 17 | Ex. 18 | Ex. 19 | Ex. 20 | Comp. Ex. 21 |
|---|---|---|---|---|---|
| Fiber content (wt %) | 1 | 3 | 6 | 18 | 6 |
| Rod |  |  |  |  |  |
| Lw (mm) | 6.0 | 5.2 | 4.6 | 4.5 | 0.6 |
| Lw/Ln | 1.3 | 1.4 | 1.5 | 1.8 | 0.6 |
| Pellet |  |  |  |  |  |
| Lw (mm) | 2.6 | 2.3 | 2.1 | 2.1 | 0.6 |
| Lw/Ln) | 1.4 | 1.4 | 1.5 | 1.9 | 1.6 |
| Flexural modulus (MPa) | 2950 | 3850 | 5080 | 10450 | 3870 |
| Flexural strength (MPa) | 102 | 124 | 155 | 215 | 101 |
| Mold shrinkage (%) | 1.3 | 0.78 | 0.44 | 0.14 | 0.93 |
| Appearance of shaped article | o | o | o | o | Δ |

Examples 21 to 24

Use was made of the same type of extruder as in Example 1 and, instead of a sheet die, the die 5 shown in Table 12. Further, plates were attached between the front end of the screw and the die 26. Polyethylene terephthalate pellets (relative viscosity of 1.35) were supplied to the plastic feed port, that is, the first feed port 39, by a screw pellet feeder, while glass roving of a diameter of 17 μm and a weight of 2200 g per 1000 meters (made by Nippon Electric Glass Co.) was continuously introduced from the fiber feeding port, that is, the second feed port. Extrusion was performed under conditions of a cylinder temperature of 280° C. and a screw rotational speed of 200 rpm. The mixture was stranded by the strand die, that is, the die 26, and the surface appearance of the strands evaluated. A good ("O") rating was given when rising of the glass fibers from the surface of the strands could not be visually observed, while a poor ("X") rating was given when rising of the glass fibers on the surface of the strands could be observed. Further, the strands were pelletized to make pellets of 10 mm length and the weight average fiber lengths of the glass fibers in the pellets were measured. Furthermore, a part of the strand was melt compressed and the dispersing conditions of the reinforcing fibers in the strands. As a result, in each Example according to the present invention, no separation between the reinforcing fibers and the resin occurred and the fibers were uniformly dispersed in the strands. The plates used were those shown in Table 11 attached between the front ends of the screw and the die. The results are shown in Table 11.

TABLE 11

|  | Ex. 21 | Ex. 22 | Ex. 23 | Ex. 24 |
|---|---|---|---|---|
| Plate | FIG. 5 | FIG. 6 | FIG. 7 | FIG. 8 |
| Plate length (mm) | 20 | 20 | 20 | 20 |
| Strand appearance | o | o | o | o |

TABLE 11-continued

|  | Ex. 21 | Ex. 22 | Ex. 23 | Ex. 24 |
|---|---|---|---|---|
| State of dispersion of fibers | o | o | o | o |
| Lw (mm) | 2.1 | 2.0 | 1.9 | 1.8 |
| Lw/Ln | 1.4 | 1.7 | 1.5 | 1.6 |
| Discharge state of strand | Good | Good | Good | Good |

Plate length: length of plate in axial direction of screw.
Lw: Weight average fiber length in sheet Examples 25 to 29

Use was made of the same type of extruder as in Example 1 and, instead of a sheet die, the die 6 shown in Table 12. Polyethylene terephthalate pellets (relative viscosity of 1.35) were fed to the plastic feed port, that is, the first feed port 39, by a screw pellet feeder, while glass roving of a diameter of 17 μm and a weight of 2200 g per 1000 meters (made by Nippon Electric Glass Co.) was continuously introduced from the fiber feeding port, that is, the second feed port. Extrusion was performed under conditions of a cylinder temperature of 280° C. and a screw rotational speed of 200 rpm. Strands of fiber reinforced plastic were formed by the die. These were cut and pelletized. At that time, the length of the glass fibers in the strands and the discharge state of the strands were studied.

TABLE 12

|  | Die 1 | Die 2 | Die 3 | Die 4 | Die 5 | Die 6 |
|---|---|---|---|---|---|---|
| Figure | FIG. 12 | FIG. 13 | FIG. 14 | FIG. 15 | FIG. 16 | FIG. 17 |
| Die thickness (mm) | 50 | 50 | 50 | 50 | 50 | 50 |
| R (mm) | 6 | 6 | 8 | 8 | 6 |  |
| r (mm) | 2 | 2 | 2 | 2 | 2 | 2 |
| d (mm) | 12 | 12 | 12 | 12 | 12 | 12 |
| L (mm) | 0 | 20 | 20 | 20 | 20 | 20 |

The results are shown in Table 13. The weight average fiber length Lw in the strands of Examples 25 to 29 was in the range of 2.0 to 2.5 mm. Further, the state of discharge of the strands was stable. Furthermore, a part of the strand was melt compressed and the dispersing conditions of the reinforcing fibers in the strands. As a result, in each Example according to the present invention, no separation between the reinforcing fibers and the resin occurred and the fibers were uniformly dispersed in the strands.

TABLE 13

|  | Ex. 25 | Ex. 26 | Ex. 27 | Ex. 28 | Ex. 29 |
|---|---|---|---|---|---|
| Die used | Die 1 | Die 2 | Die 3 | Die 4 | Die 5 |
| State of dispersion of fibers | o | o | o | o | o |
| Lw/Ln | 1.5 | 1.7 | 1.6 | 1.8 | 1.6 |
| Stability of discharge of strands | o | o | o | o | o |

As clear from the above explanation and the examples, in the present invention, it was discovered that by controlling the degree of combing and dispersing the reinforcing fibers uniformly and by using a kneading action to achieve a specific distribution of fiber lengths while keeping the weight average fiber length long, it is possible to obtain a fiber reinforced thermoplastic resin structure superior in fluidity, mechanical properties, and surface smoothness and that, further, by having the continuous roving wound around the screw and by the processing applied to the screw outer circumference and/or the cylinder inner surface, it is possible to create a comb action on the continuous roving and control the degree of combing and fiber length of the reinforcing fibers. By this, it is possible to obtain a fiber reinforced thermoplastic resin structure with a high productivity, good fluidity at the time of molding, and superior mechanical properties never before able to be obtained. The invention is therefore extremely valuable from the industrially viewpoints.

We claim:

1. A fiber reinforced thermoplastic resin structure comprising a thermoplastic resin and reinforcing fibers, having a ratio (Lw/Ln) of the number average fiber length (Ln) to the weight average fiber length (Lw) of the uniformly dispersed reinforcing fibers of 1.1 to 5, and having a weight average fiber length of 1.0 mm to 200 mm.

2. A fiber reinforced thermoplastic resin structure as claimed in claim 1, wherein the ratio (Lw/Ln) of the number average fiber length (Ln) to the weight average fiber length (Lw) of the reinforcing fibers is 1.1 to 3 and the weight average fiber length is 1.0 mm to 15 mm.

3. A fiber reinforced thermoplastic resin structure as claimed in claim 1, wherein the weight average fiber length of the reinforcing fibers is 4.5 mm to 12 mm.

4. A fiber reinforced thermoplastic resin structure as claimed in claim 1, wherein the reinforcing fibers in bundles of 10 or more constitute not more than 60% of all the reinforcing fibers observed in a cross-section of the fiber reinforced thermoplastic resin structure.

5. A fiber reinforced thermoplastic resin structure as claimed in claim 1, wherein the content of reinforcing fibers in the fiber reinforced thermoplastic resin structure is 0.5 to 90% by weight.

6. A fiber reinforced thermoplastic resin structure as claimed in claim 1, wherein the content of reinforcing fibers in the fiber reinforced thermoplastic resin structure is 1 to 60% by weight.

7. A fiber reinforced thermoplastic resin structure as claimed in claim 1, wherein the reinforcing fiber is glass fiber, carbon fiber or a mixture thereof.

8. A fiber reinforced thermoplastic resin structure as claimed in claim 1, wherein the thermoplastic resin is at least one resin selected from the group consisting of polyethylene, polypropylene, polybutylene terephthalate, polyethylene terephthalate, polycyclohexane dimethylene terephthalate, polyethylene terephthlate copolymer type liquid crystal polymers, nylon 11, nylon 12, nylon 6, nylon 66, aromatic nylon, copolymerized nylon, polyphenylene sulfide, and ABS resins.

9. A fiber reinforced thermoplastic resin structure as claimed in claim 1, wherein the fiber reinforced thermoplastic resin structure is a sheet or a rod in shape.

10. A fiber reinforced thermoplastic resin structure as claimed in claim 1, wherein the fiber reinforced thermoplastic resin structure is obtained by extrusion.

11. A fiber reinforced thermoplastic resin structure as claimed in claim 9, wherein the fiber reinforced thermoplastic resin structure is a fiber reinforced thermoplastic resin sheet, the ratio (Lw/Ln) of the number average fiber length (Ln) to the weight average fiber length (Lw) of the reinforcing fibers in the sheet is 1.3 to 5.0, the weight average fiber length is 3 mm to 200 mm, and the reinforcing fibers in bundles of 10 or more constitute not more than 60% of all the reinforcing fibers observed.

12. A fiber reinforced thermoplastic resin structure as claimed in claim 11, wherein the weight average fiber length is from 3 mm to 100 mm.

13. A fiber reinforced thermoplastic resin structure as claimed in claim 11, wherein the reinforcing fibers in bundles of 10 or more constitute not more than 35% of all the reinforcing fibers observed.

14. A fiber reinforced thermoplastic resin structure as claimed in claim 11, wherein the ratio (Lw/Ln) of the number average fiber length (Ln) to the weight average fiber length (Lw) of the reinforcing fibers is 1.5 to 4.0.

* * * * *